United States Patent
Wu et al.

(10) Patent No.: US 12,041,367 B2
(45) Date of Patent: Jul. 16, 2024

(54) COLUMN-PARALLEL ADC ARCHITECTURES FOR HIGH-SPEED CMOS IMAGE SENSORS

(71) Applicant: Alphacore, Inc., Tempe, AZ (US)

(72) Inventors: Wenlan Wu, Chandler, AZ (US); Esko Mikkola, Mesa, AZ (US)

(73) Assignee: Alphacore, Inc., Tempe, AZ (US)

( * ) Notice: Subject to any disclaimer, the term of this patent is extended or adjusted under 35 U.S.C. 154(b) by 165 days.

(21) Appl. No.: 17/498,529

(22) Filed: Oct. 11, 2021

(65) Prior Publication Data
US 2022/0132063 A1 Apr. 28, 2022

Related U.S. Application Data

(60) Provisional application No. 63/105,762, filed on Oct. 26, 2020.

(51) Int. Cl.
*H04N 25/75* (2023.01)
*H04N 25/771* (2023.01)
*H04N 25/772* (2023.01)

(52) U.S. Cl.
CPC ........... *H04N 25/75* (2023.01); *H04N 25/771* (2023.01); *H04N 25/772* (2023.01)

(58) Field of Classification Search
CPC .... H04N 25/75; H04N 25/771; H04N 25/772; H04N 25/616
See application file for complete search history.

(56) References Cited

U.S. PATENT DOCUMENTS

| | | | |
|---|---|---|---|
| 2009/0051801 A1* | 2/2009 | Mishina | H04N 25/778 348/311 |
| 2013/0020469 A1* | 1/2013 | Okura | H03M 1/00 250/208.1 |
| 2013/0154705 A1* | 6/2013 | Sakurai | H03K 3/86 327/179 |
| 2015/0036032 A1* | 2/2015 | Itano | H04N 25/75 348/301 |

* cited by examiner

*Primary Examiner* — Nicholas G Giles
(74) *Attorney, Agent, or Firm* — Alphacore IP

(57) ABSTRACT

A signal processing system for an imaging device is provided. The signal processing system includes: a plurality of readout circuitries that are connected in parallel, where each readout circuitry includes: one or more interface circuits to receive an analog signal; an analog-to-digital converter (ADC) circuit to convert the analog signal to a digital signal; and a plurality of switches coupled between the ADC circuit and a plurality of storage circuits, where the plurality of switches includes a first switch and a second switch; a controller to: (i) control the first switch to decouple the ADC circuit from a first storage circuit, where the first storage circuit stores a previous digital signal of a previous iteration; and (ii) control the second switch to couple the ADC circuit to the second storage circuit, where the second storage circuit stores a current digital signal; and a transmitter to transmit the previous digital signal.

20 Claims, 9 Drawing Sheets

COLUMN-PARALLEL ADC ARCHITECTURES FOR HIGH-SPEED CMOS IMAGE SENSORS

TECHNOLOGICAL FIELD

The present disclosure generally relates to signal processing and more particularly relates to a signal processing system for an imaging device.

BACKGROUND

Currently, there are various imaging devices that generate images of high-quality. Indeed, the quality of the images is related to the number of pixels in the images. Since the quality of the images is related to the number of pixels in the images, the imaging devices should include sufficient number of pixel sensors to generate the high-quality images. Some available techniques aim to include the sufficient number of pixel sensors in the image devices by reducing a pixel pitch. The reduction in pixel pitch may enable to include the sufficient number of pixel sensors in the image devices without increasing a size of the imaging devices, an optical format of the imaging devices, and/or cost of the imaging device.

However, the increase in the number of pixel sensors for generating the high-quality images demands for a high bandwidth readout circuitry. Some available methods aim to provide the high bandwidth readout circuitry by implementing high-conversion-rate ADCs (analog-to-digital converts). Some other available methods aim to provide the high bandwidth readout circuitry by implementing a larger number of standard ADCs. But these available methods are not efficient, since the high-conversion-rate ADCs consume more power than the standard ADCs and further the increase in the number of ADCs also demands for more power and more space for accommodating the increased number of ADCs.

BRIEF SUMMARY

In order to solve the foregoing problem, the present disclosure provides a signal processing system that is configured to perform a readout operation for an imaging device. The readout operation comprises two processes and/steps: (i) a data conversion step and (ii) a data transmission step. In the data conversion step, an analog signal corresponding to pixel data of the imaging device may be converted to a digital signal. In data transmission step, the converted digital signal may be transmitted to an acquisition unit for generating a digital image. It is an objective some embodiments to simultaneously perform the data conversion step and the data transmission step. Thereby, a required readout bandwidth is achieved without using the high-conversion-rate ADCs and/or increasing the number of ADCs. Accordingly, the power requirements may also be reduced. Therefore, the signal processing system of the present disclosure may perform the readout operation in an efficient manner.

According to an embodiment, the present disclosure provides the signal processing system for the imaging device. The signal processing system includes a plurality of readout circuitries connected in parallel, where each readout circuitry is further connected to a plurality of pixel sensors that are arranged in a column of a pixel array of the imaging device, where each readout circuitry includes: one or more interface circuits to receive an analog signal from a respective column of the pixel array; an analog-to-digital converter (ADC) circuit coupled to the one or more interface circuits, where the ADC circuit converts the received analog signal to a digital signal; and a plurality of switches coupled between the ADC circuit and a plurality of storage circuits. The plurality of switches includes: (i) a first switch coupled between the ADC circuit and a first storage circuit of the plurality of storage circuits and (ii) a second switch coupled between the ADC circuit and a second storage circuit of the plurality of storage circuits. Further, the signal processing system includes controller coupled to the plurality of readout circuitries, where the controller is configured to iteratively execute a first operation. When the first operation is executed in a current iteration, the controller may: (i) control the first switch of each readout circuitry to decouple the ADC circuit of each readout circuitry from the first storage circuit of each readout circuitry, where the first storage circuit of each readout circuitry stores a previous digital signal of a previous iteration; and (ii) control the second switch of each readout circuitry to couple the ADC circuit of each readout circuitry to the second storage circuit of each readout circuitry, where the second storage circuit of each readout circuitry stores a current digital signal converted by the corresponding ADC circuit. Furthermore, the signal processing system includes a transmitter coupled to the plurality of readout circuitries, where the transmitter may transmit the previous digital signal stored in the first storage circuit of each readout circuitry.

According to another embodiment, the present disclosure provides the signal processing system for the imaging device. The signal processing system includes a plurality of readout circuitries connected in parallel, where each readout circuitry is further connected to a pixel sensor of a pixel array of the imaging device, where each readout circuitry includes: one or more interface circuits to receive an analog signal from a respective pixel sensor of the pixel array; an analog-to-digital converter (ADC) circuit coupled to the one or more interface circuits, where the ADC circuit converts the received analog signal to a digital signal; and a plurality of switches coupled between the ADC circuit and a plurality of storage circuits. The plurality of switches includes: (i) a first switch coupled between the ADC circuit and a first storage circuit of the plurality of storage circuits and (ii) a second switch coupled between the ADC circuit and a second storage circuit of the plurality of storage circuits. Further, the signal processing system includes controller coupled to the plurality of readout circuitries, where the controller is configured to iteratively execute a first operation. When the first operation is executed in a current iteration, the controller may: (i) control the first switch of each readout circuitry to decouple the ADC circuit of each readout circuitry from the first storage circuit of each readout circuitry, where the first storage circuit of each readout circuitry stores a previous digital signal of a previous iteration; and (ii) control the second switch of each readout circuitry to couple the ADC circuit of each readout circuitry to the second storage circuit of each readout circuitry, where the second storage circuit of each readout circuitry stores a current digital signal converted by the corresponding ADC circuit. Furthermore, the signal processing system includes one or more transmitters coupled to the plurality of readout circuitries, where the one or more transmitters may transmit the previous digital signal stored in the first storage circuit of each readout circuitry.

According to yet another embodiment, the present disclosure provides a signal processing system for transmitting digital data. The signal processing system includes a circuitry comprising: one or more interface circuits to receive an analog signal; an analog-to-digital converter (ADC) circuit coupled to the one or more interface circuits, where the ADC circuit converts the received analog signal to a digital signal; and a plurality of switches coupled between the ADC circuit and a plurality of storage circuits. Further, the signal processing system includes controller coupled to the circuitry, where the controller is configured to iteratively execute a first operation. When the first operation is executed in a current iteration, the controller may: (i) control a first switch of the plurality of switches to decouple the ADC circuit from a first storage circuit of the plurality of storage circuits, where the first storage circuit stores a previous digital signal of a previous iteration; and (ii) control a second switch of the plurality of switches to couple the ADC circuit to the second storage circuit of the plurality of storage circuits, where the second storage circuit stores a current digital signal converted by the ADC circuit. Furthermore, the signal processing system includes a transmitter coupled to the circuitry, where the transmitter may transmit the previous digital signal as the digital data.

According to yet another embodiment, the present disclosure provides a method for transmitting digital data. The method includes receiving, by one or more interface circuits, an analog signal; converting, by an analog-to-digital converter (ADC) circuit, the received analog signal to a digital signal; and iteratively executing, by a controller, a first operation. When the first operation is executed in a current iteration, the controller is configured for: controlling a first switch of a plurality of switches to decouple the ADC circuit from a first storage circuit of a plurality of storage circuits, where the first storage circuit is configured for storing a previous digital signal of a previous iteration; and controlling a second switch of a plurality of switches to couple the ADC circuit from a second storage circuit of a plurality of storage circuits, where the second storage circuit is configured for storing a current digital signal converted by the ADC circuit. The method may further include transmitting, by a transmitter, the previous digital signal as the digital data.

Various embodiments thus provide systems and methods for signal processing in an imaging device, that utilize a column-parallel ADC architecture. The column-parallel ADC architecture includes column-parallel readout circuits, and further include a serializer and low-power ADCs. The ADCs can be a successive-approximation-register (SAR) ADC or a slope (integrating) ADC (single-slope or dual-slope). The column-parallel architecture offers a technical advantage of providing enhanced speed for the imaging device, with a frame rate greater than 10,000 frames per second in a 1,000,000-pixel (mega-pixel) array of a Camera-On-a-Chip system associated with the imaging device. Further, the systems and methods providing the column-parallel architecture also provide the technical benefit of being able to achieve a high pixel rate, such as much larger than 10 Gpixels per second, while using the imaging device based on the column-parallel architecture described in various embodiments disclosed herein. The column-parallel architecture includes one ADC or several ADCs per column, each ADC has two storage circuits (the first storage circuit and the second storage circuit) associated with it, in the form of two memory banks. These two memory banks can be switched to work with the ADC to store the converted digital signal or bits and to operate as shift registers connected to the serializer. As a result, two memory banks achieve a ping-pong operation for ADC conversion and high-speed data transfer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1A:
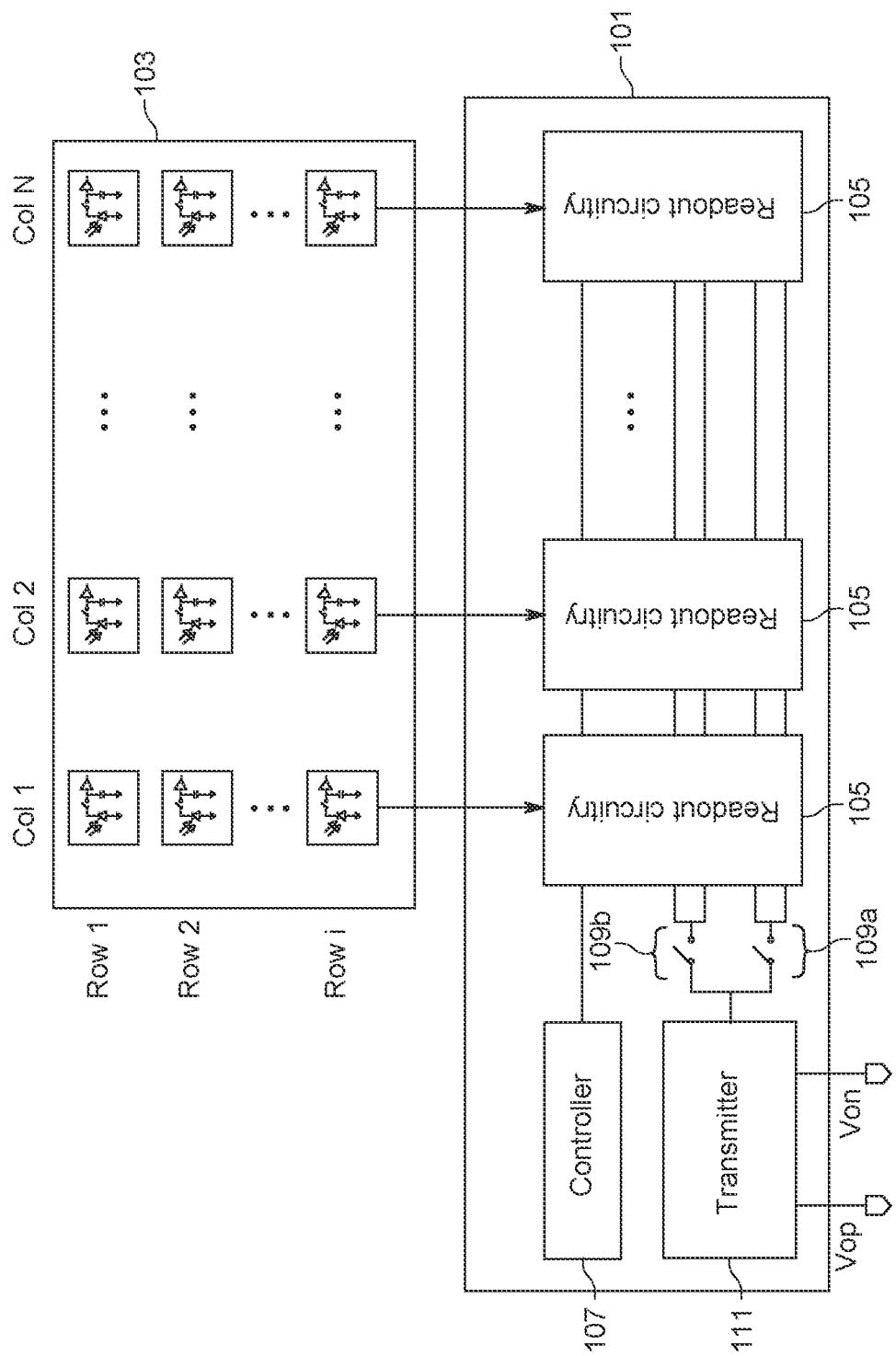
Figure 1B:
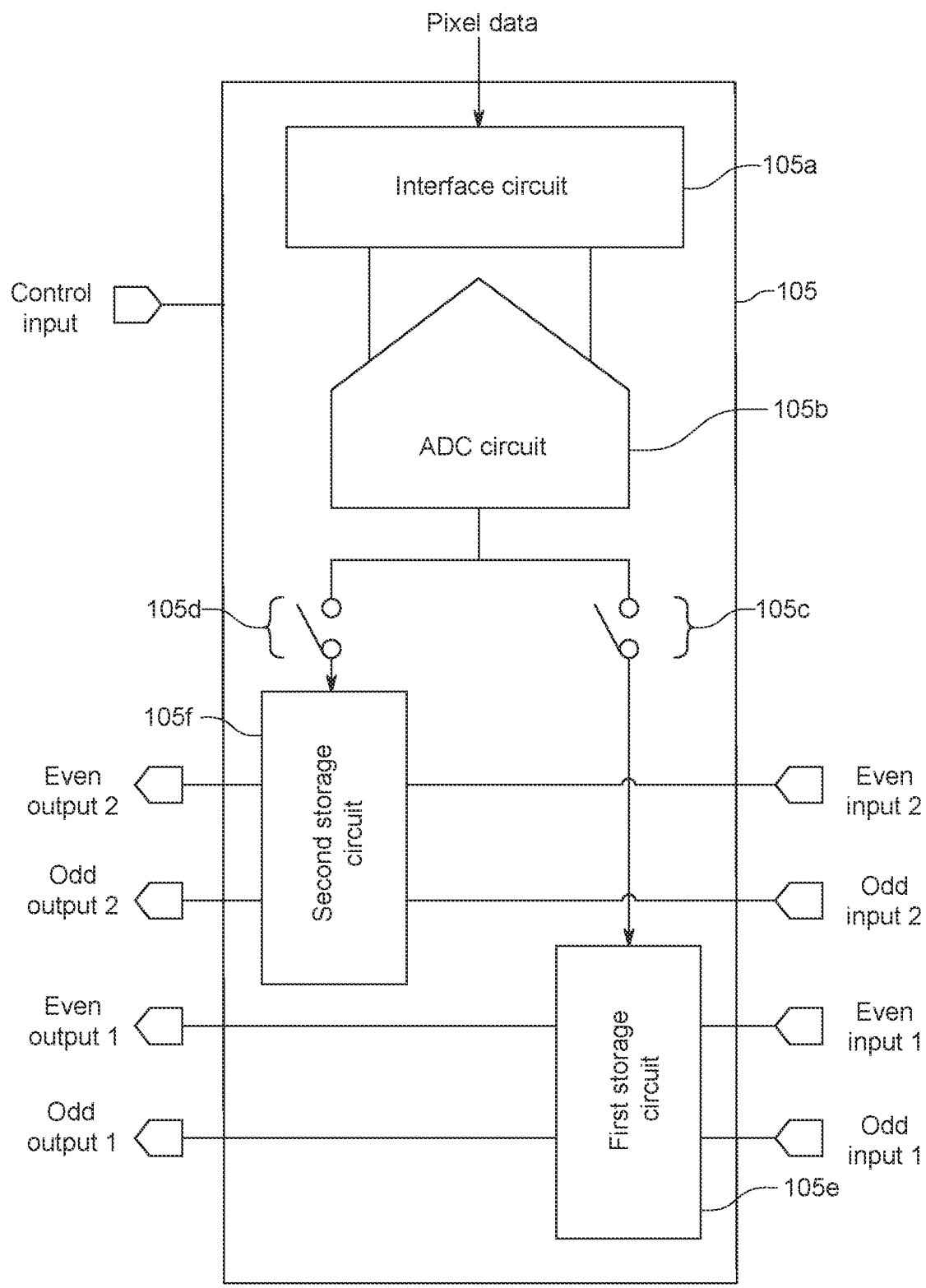
Figure 1C:
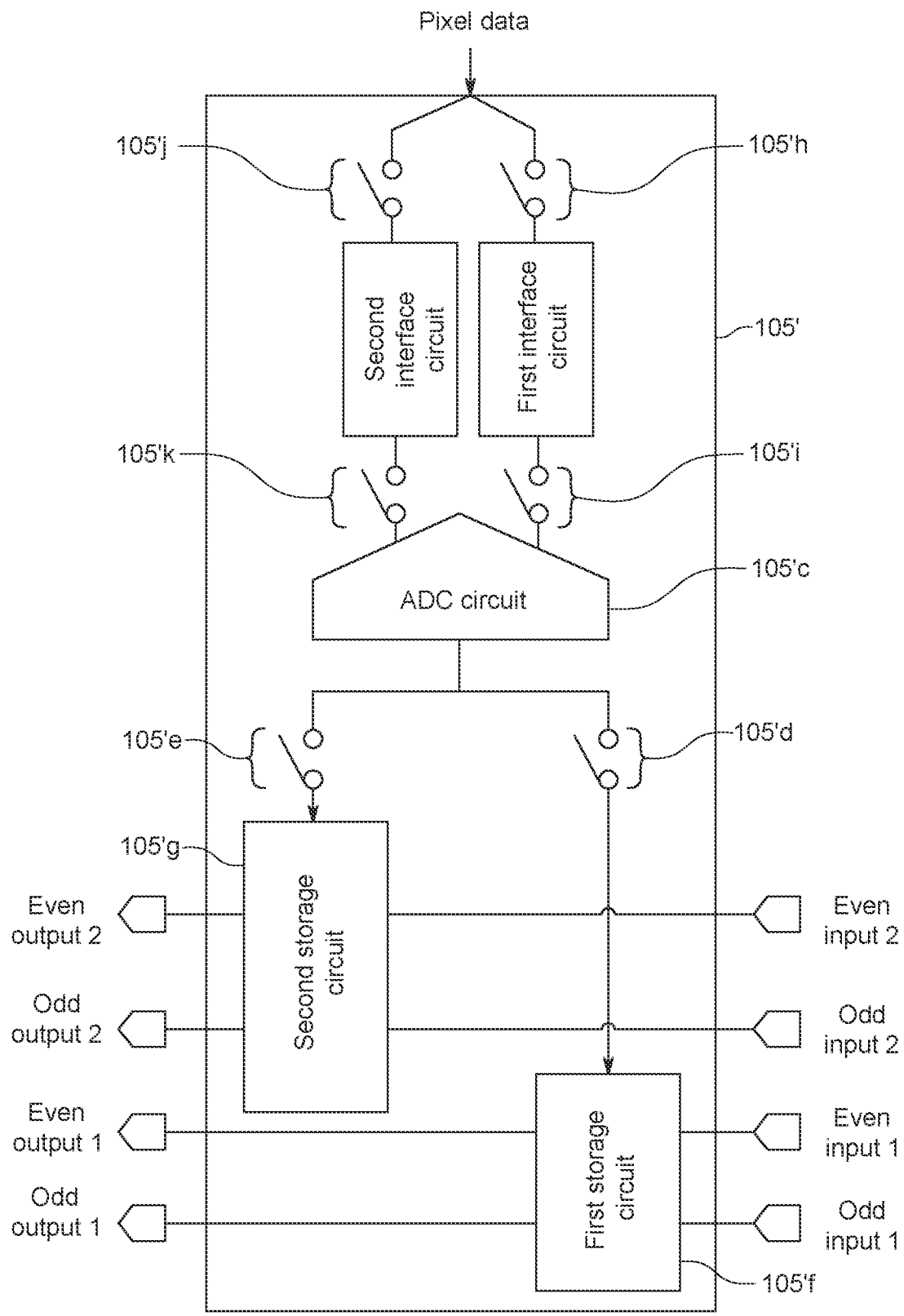
Figure 2:
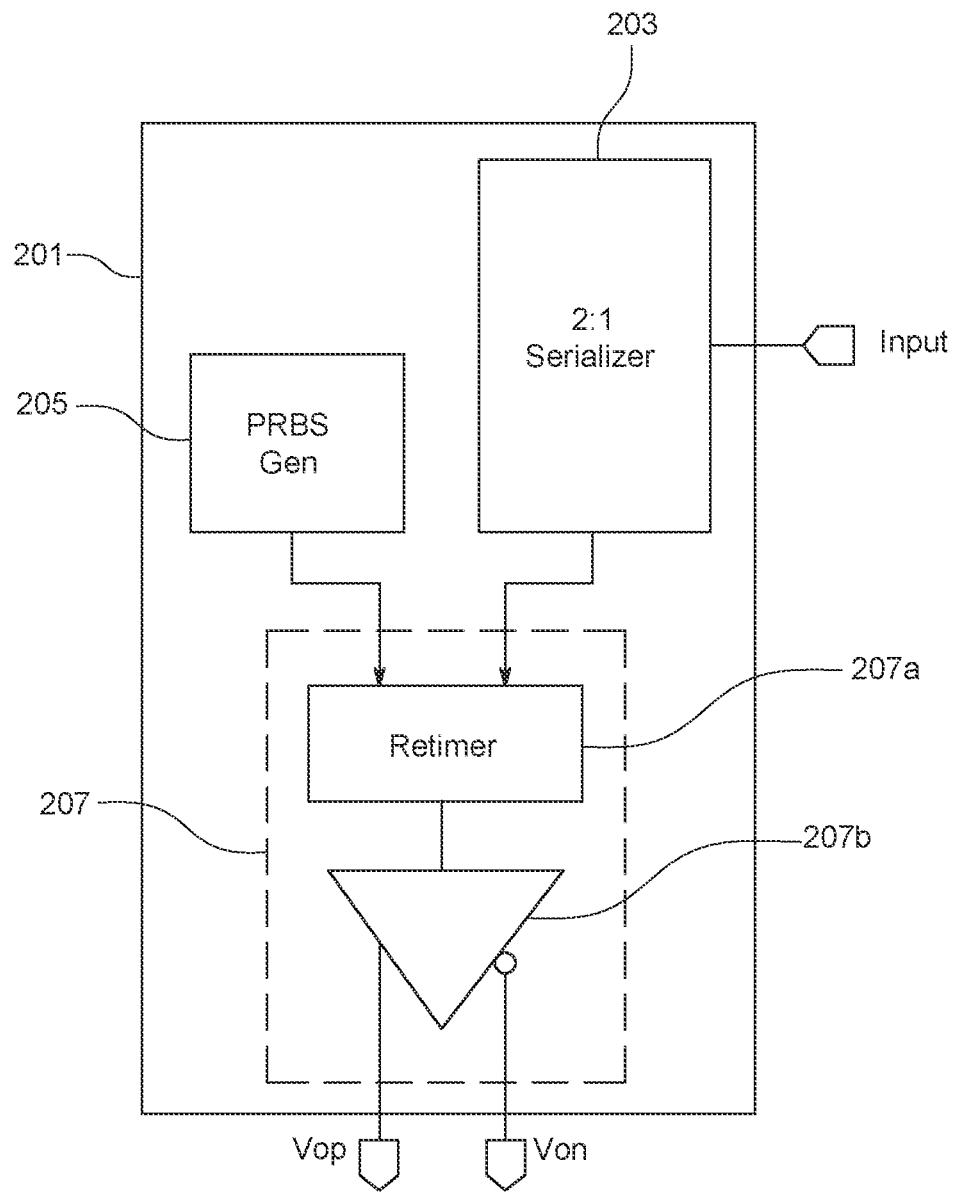
Figure 3:
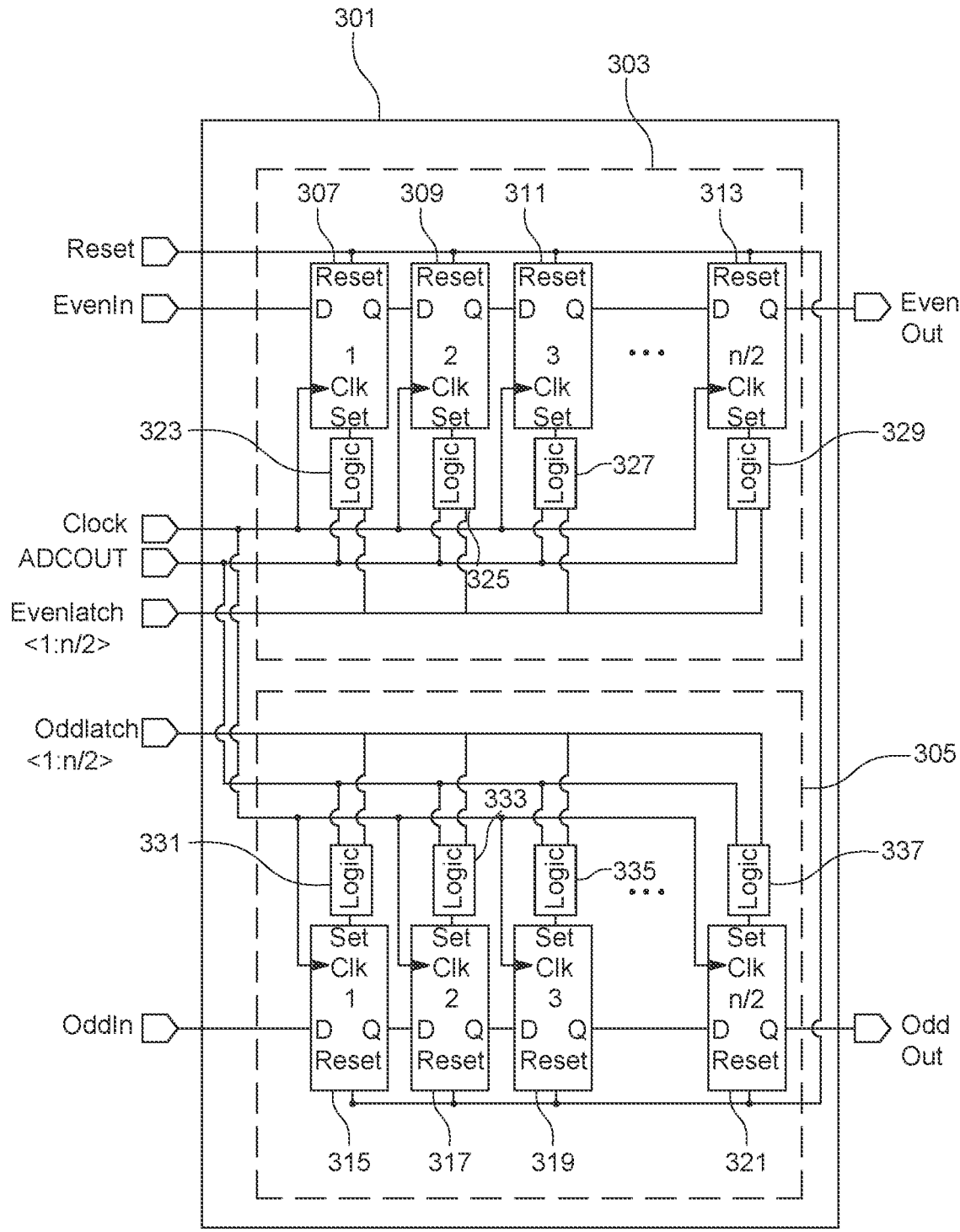
Figure 4A:
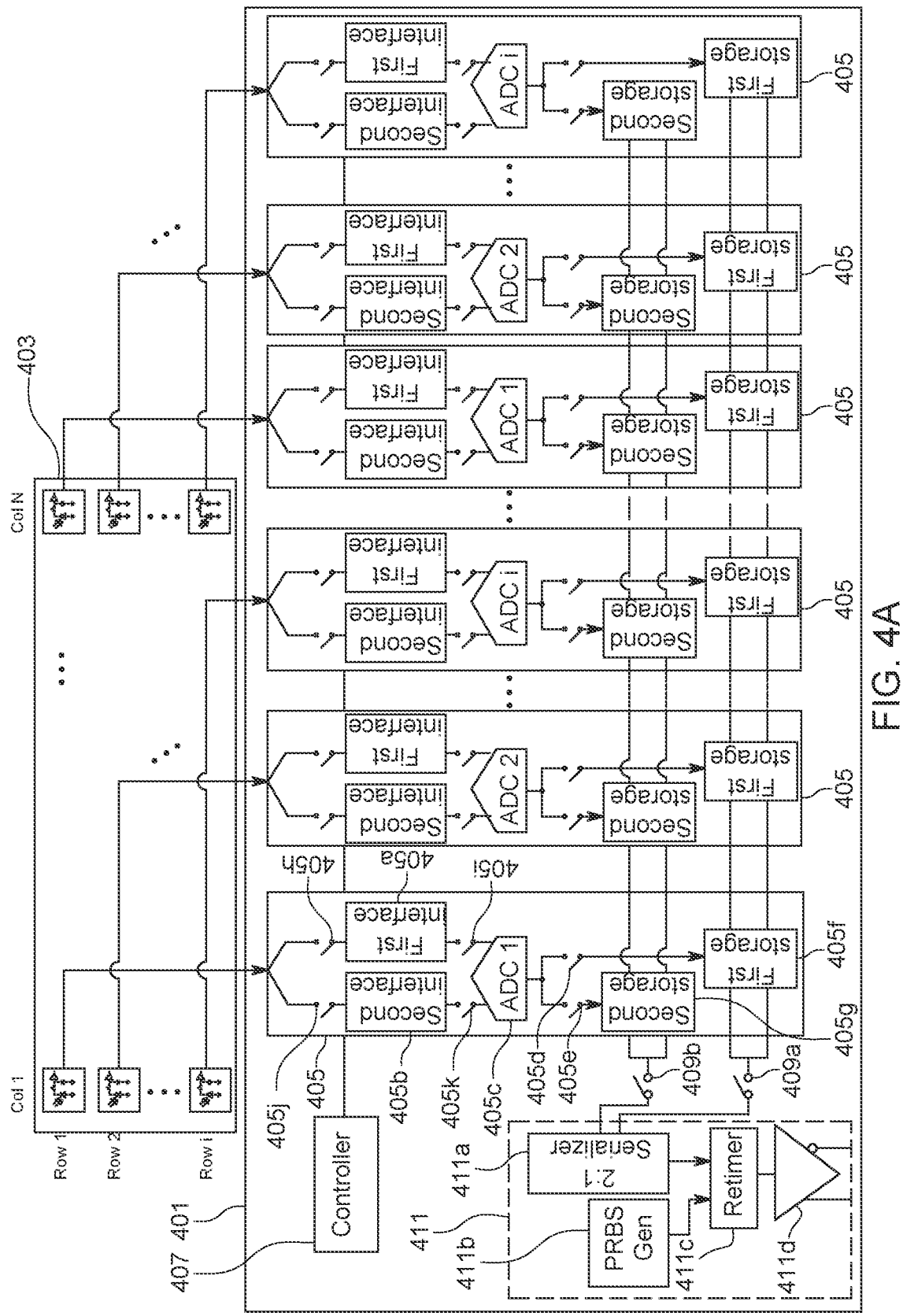
Figure 4B:
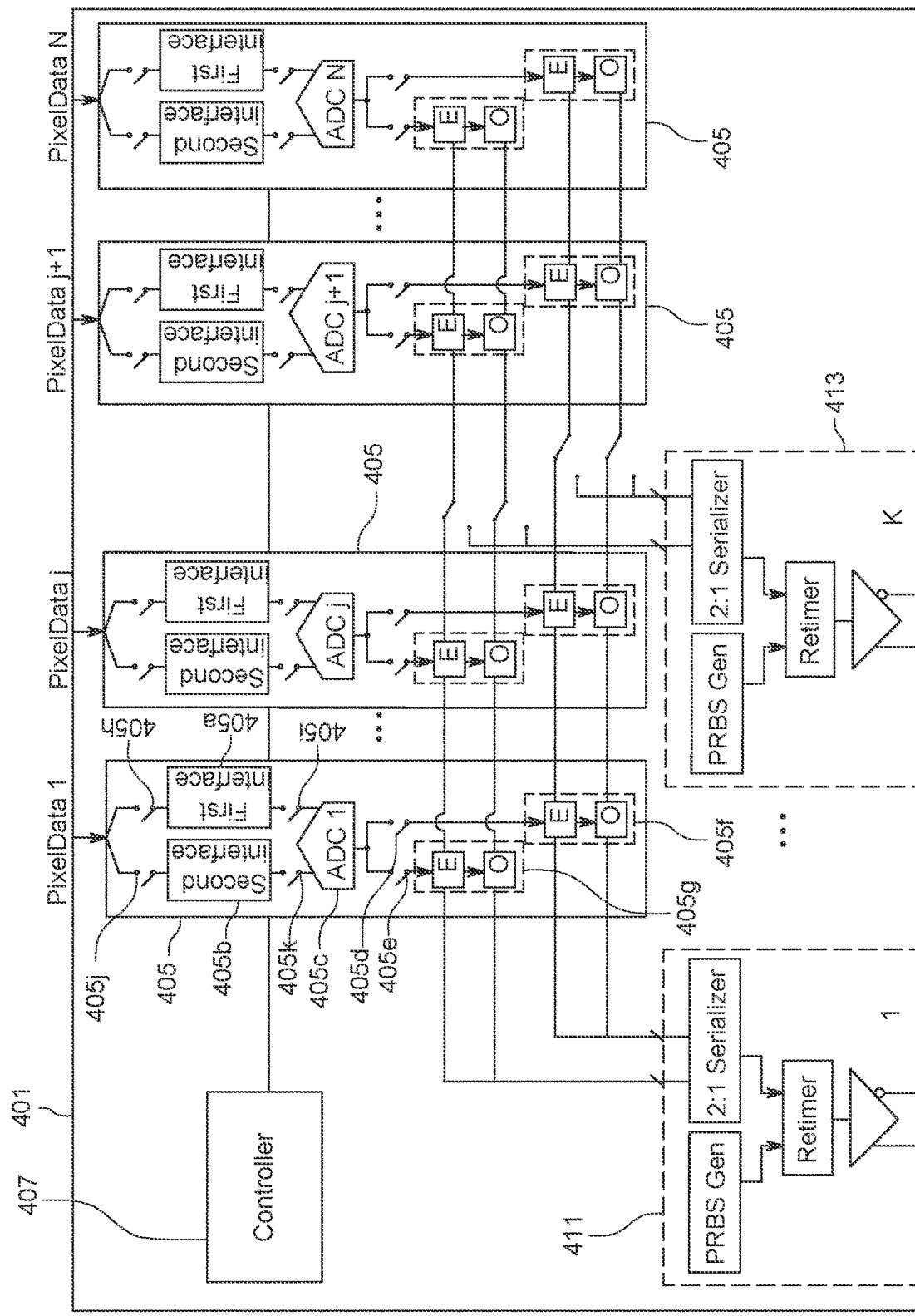
Figure 5A:
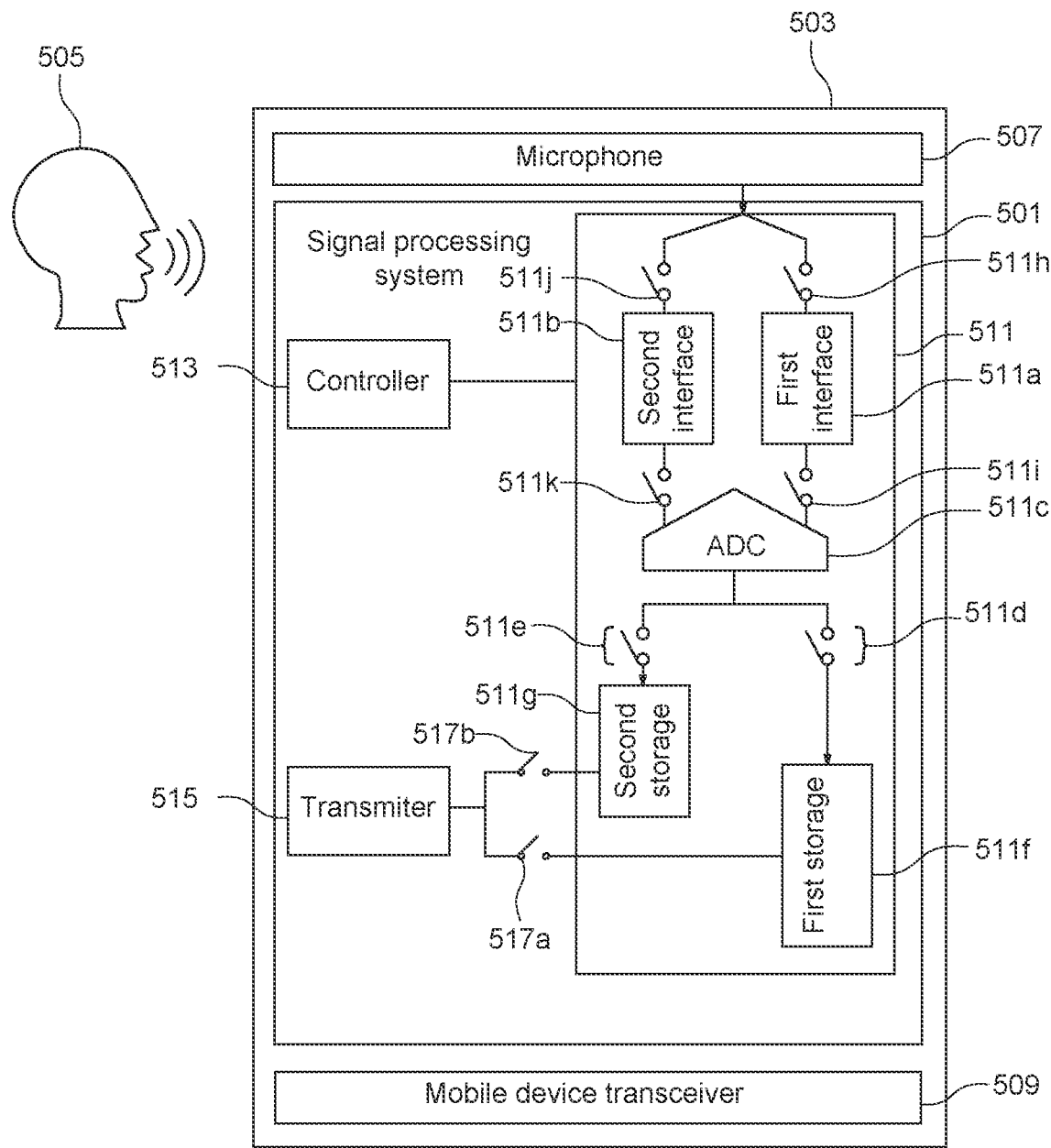
Figure 5B:
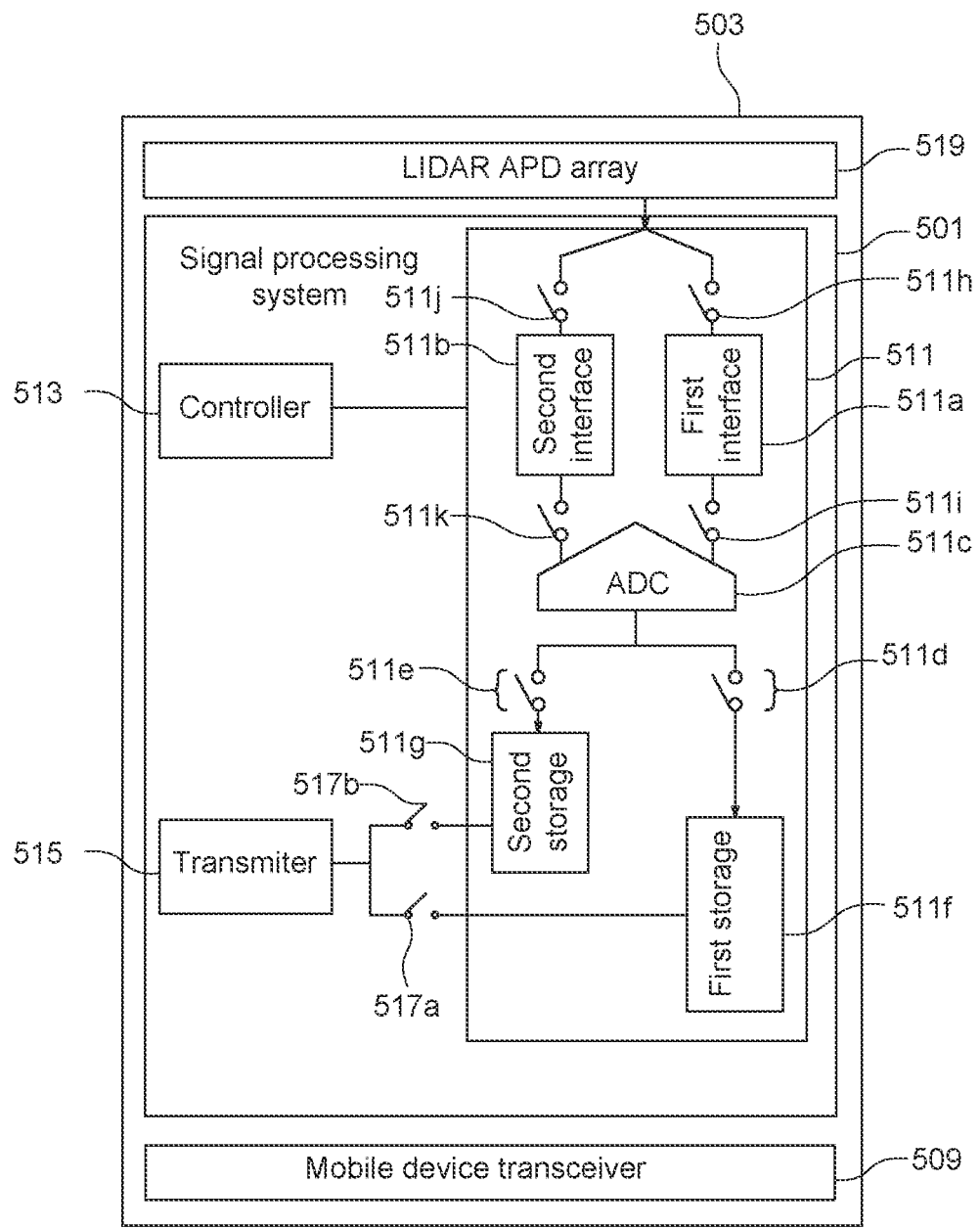

Having thus described example embodiments of the present disclosure in general terms, reference will now be made to the accompanying drawings, which are not necessarily drawn to scale, and wherein:

FIG. 1A illustrates a block diagram showing a signal processing system for an imaging device, according to an embodiment of the present disclosure;

FIG. 1B illustrates a block diagram showing a first architecture of a readout circuitry, according to an embodiment of the present disclosure;

FIG. 1C illustrates a block diagram showing a second architecture of a readout circuitry with multiple interface circuits, according to another embodiment of the present disclosure;

FIG. 2 illustrates a block diagram showing an exemplary architecture of a transmitter, according to an embodiment of the present disclosure;

FIG. 3 illustrates a block diagram showing an exemplary architecture of a storage circuit, according to an embodiment of the present disclosure;

FIG. 4A illustrates a block diagram showing the signal processing system for the imaging device, according to another embodiment of the present disclosure;

FIG. 4B illustrates a block diagram showing the signal processing system with multiple transmitters, according to an embodiment of the present disclosure;

FIG. 5A illustrates a block diagram showing the signal processing system coupled with a microphone of a mobile device, according to an embodiment of the present disclosure; and FIG. 5B illustrates a block diagram showing the signal processing system coupled with a LIDAR ADP array of the mobile device, according to another embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus (or a system) to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

FIG. 1A illustrates a block diagram showing a signal processing system 101 for an imaging device 103, according to an embodiment of the present disclosure. The imaging device 103 may correspond to an image sensor. For instance, the imaging device 103 may be a Complementary Metal-Oxide-Semiconductor (CMOS) image sensor. The imaging device 103 may include a pixel array, row decoders, and level shifters among other things. The pixel array of the imaging device 103 may include a plurality of pixel sensors that are arranged in rows and columns as illustrated in FIG. 1A. For instance, the pixel array may include 'N' columns, where each column of the pixel array may include 'i' pixel sensors. Thereby, the pixel array may include i×N pixel sensors. For example, the pixel array of the imaging device 103 may include one mega pixel sensors. Thereby, the imaging device 103 may produce an image of one mega pixels.

Each pixel sensor of the pixel array may include an image circuitry that is configured to convert lights waves (or electromagnetic waves) into signals of analog form. The image circuitry may include a photo diode, a transfer transistor, a reset transistor, an amplifier transistor, a select transistor and/or the like. Hereinafter, 'signals of analog form' and 'analog signals' may be interchangeably used to mean the same. As used herein, the analog signal may be a continuous signal for which a time-varying feature of the signal is a representation of a time-varying physical quantity such as voltage, current and/or the like.

These analog signals generated by the imaging device 103 may be converted into its corresponding digital signals by the signal processing system 101 for generating a digital image or the like. To this end, the signal processing system 101 may be operatively coupled to the imaging device 103. According to an embodiment, the signal processing system 101 may include a plurality of readout circuitries 105 for converting the analog signals into its corresponding digital signals. Hereinafter, 'readout circuitry' can also be referred to as 'circuitry'. In an example embodiment, the signal processing system 101 may include 'N' readout circuitries 105 that are connected in parallel and further each readout circuitry 105 may be connected to 'i' pixel sensors that are arranged in one column of the pixel array, as illustrated in FIG. 1A. For instance, in one embodiment, the configuration of the readout circuitry 105 is as illustrated in FIG. 1B. In another embodiment, the configuration of the readout circuitry 105 is as illustrated in FIG. 1C.

FIG. 1B illustrates a block diagram showing a first architecture of the readout circuitry 105, according to an embodiment of the present disclosure. FIG. 1B is explained in conjunction with FIG. 1A. The readout circuitry 105 may include an interface circuit 105a, an Analog-to-Digital Converter (ADC) circuit 105b, a plurality of switches 105c and 105d, and a plurality of storage circuits 105e and 105f. The interface circuit 105a may be an Analog Front-End (AFE), which acts as an interface for receiving the analog signal(s) from the pixel array. Further, the interface circuit 105a may be configured to sample the received analog(s) to generate sampled analog signal(s). For instance, 'sampling' may be a process where a continuous-time signal (i.e., the analog signal) is reduced to a discrete-time signal (i.e., the sampled analog signal). Furthermore, the interface circuit 105 may forward the sampled analog signal(s) to the ADC circuit 105b. The interface circuit 105a may include a sample and hold circuit, a trans-impedance amplifier (TIA), switched-capacitors, amplifiers, filters, or the like. In an example embodiment, the interface circuit 105a may be configured to sequentially receive the analog signal(s) corresponding to pixel data of each pixel sensor of a respective column of the pixel array. For instance, the interface circuit 105a of the readout circuitry 105 connected to the column-1 of the pixel array may sequentially receive the analog signal(s) corresponding to pixel data of each pixel sensor that is present in the column-1 of the pixel array.

In an example embodiment, the ADC circuit 105b may be coupled to the interface circuit 105a to sequentially receive the sampled analog signal(s) from the interface circuit 105a. According to an embodiment, the ADC circuit 105b may be configured to convert the received analog signal(s) (i.e., the sampled analog signal(s)) into the corresponding digital signal(s). For instance, as the interface circuit 105a sequentially receives the analog signal(s) and forwards the sampled analog signal(s), the ADC circuit 105*b* may be configured to sequentially convert the received analog signal(s) into its corresponding digital signal(s). In one embodiment, the ADC circuit 105*b* may be a Successive Approximation Register (SAR) ADC. In another embodiment, the ADC circuit 105*b* may be an integrating ADC such as a single-slope ADC, a dual-slope ADC, or the like. For purpose of explanation, the ADC circuit 105*b* is considered to be the SAR ADC and/or the integrating ADC, however any other known analog-to-digital data conversion can be used without deviating from the scope of the present disclosure.

Further, the readout circuitry 105 may include the plurality of switches 105*c* and 105*d* that are coupled between the ADC circuit 105*b* and the plurality of storage circuits 105*e* and 105*f*, as illustrated in FIG. 1B. For instance, a first switch 105*c* of the plurality of switches 105*c* and 105*d* may be coupled between the ADC circuit 105*b* and a first storage circuit 105*e* of the plurality of storage circuits 105*e* and 105*f*. Similarly, a second switch 105*d* of the plurality of switches 105*c* and 105*d* may be coupled between the ADC circuit 105*b* and a second storage circuit 105*f* of the plurality of storage circuits 105*e* and 105*f*. For instance, the plurality of switches 105*c* and 105*d* may be embodied as transistors or the like.

In an example embodiment, the plurality of switches 105*c* and 105*d* may be configured to couple/decouple the ADC circuit 105*b* with the plurality of storage circuits 105*e* and 105*f* respectively. In other words, the plurality of switches 105*c* and 105*d* may be configured to turn-on/turn-off a connection between the ADC circuit 105*b* and the plurality of storage circuits 105*e* and 105*f* respectively. For example, if the first switch 105*c* couples the ADC circuit 105*b* to the first storage circuit 105*e*, then the digital signal converted by the ADC circuit 105*b* may be stored in the first storage circuit 105*e*. Alternatively, if the first switch 105*c* decouples the ADC circuit 105*b* from the first storage circuit 105*e*, then the digital signal converted by the ADC circuit 105*b* may not be stored in the first storage circuit 105*e*. Similarly, if the second switch 105*d* couples the ADC circuit 105*b* to the second storage circuit 105*f*, then the digital signal converted by the ADC circuit 105*b* may be stored in the second storage circuit 105*f*.

The plurality of storage circuits 105*e* and 105*f* may be storage elements such as flip-flops or the like. In an example embodiment, the first storage circuit 105*e* of one readout circuitry 105 may be connected to the first storage circuit 105*e* of next subsequent readout circuitry 105 to form a daisy-chain connection. For instance, the daisy-chain connection between the first storage circuits 105*e* of the plurality of readout circuitries 105 may be a linear daisy-chain connection from right to left. Further, the first storage circuit 105*e* may separately store even digital data and odd digital data. Accordingly, the first storage circuit 105*e* of the readout circuitry 105 may include two inputs (Even input 1 and Odd input 1) and two outputs (Even output 1 and Odd output 1).

Similarly, the second storage circuit 105*f* of one readout circuitry 105 may be connected to the second storage circuit 105*f* of next subsequent readout circuitry 105 to form the daisy-chain connection. Further, the second storage circuit 105*f* may also separately store even digital data and odd digital data. Thereby, the second storage circuit 105*f* of the readout circuitry 105 may also include two inputs (Even input 2 and Odd input 2) and two outputs (Even output 2 and Odd output 2).

FIG. 1C illustrates a block diagram showing a second architecture of a readout circuitry 105' with multiple interface circuits, according to another embodiment of the present disclosure. FIG. 1C is explained in conjunction with FIG. 1A. The readout circuitry 105' may correspond to each readout circuitry 105 (shown in FIG. 1A). The readout circuitry 105' may include multiple interface circuits 105'*a* and 105'*b*, an Analog-to-Digital Converter (ADC) circuit 105'*c*, a plurality of switches 105'*d* and 105'*e*, and a plurality of storage circuits 105'*f* and 105'*g*, a plurality of secondary switches 105'*h*, 105'*i*, 105'*j*, and 105'*k*. For instance, the multiple interface circuits 105'*a* and 105'*b* includes a first interface circuit 105'*a* and a second interface circuit 105'*b*. Each of the multiple interface circuits 105'*a* and 105'*b* may correspond to the interface circuit 105*a* explained in the detailed description of FIG. 1B. For instance, each of the multiple interface circuits 105'*a* and 105'*b* may receive the analog signal(s) from the pixel array and forward the sampled analog signal(s) to the ADC circuit 105'*c*. The ADC circuit 105'*c* may correspond to the ADC circuit 105*b* explained in the detailed description of FIG. 1B. For instance, the ADC circuit 105'*c* may be coupled to the multiple interface circuits 105'*a* and 105'*b* for converting the received analog signal(s) (i.e., the sampled analog signal(s)) into the corresponding digital signal(s).

Further, the readout circuitry 105' may include the plurality of switches 105'*d* and 105'*e* that are coupled between the ADC circuit 105'*c* and the plurality of storage circuits 105'*f* and 105'*g*. The plurality of switches 105'*d* and 105'*e* may correspond to the plurality of switches 105*c* and 105*d* explained in the detailed description of FIG. 1B. For instance, the plurality of switches 105'*d* and 105'*e* may include a first switch 105'*d* and a second switch 105'*e*, where the first switch 105'*d* and the second switch 105'*e* correspond to the first switch 105*c* and the second switch 105*d* respectively. For example, the plurality of switches 105'*d* and 105'*e* may be configured to couple/decouple the ADC circuit 105'*c* with the plurality of storage circuits 105'*f* and 105'*g*, as explained in the detailed description of FIG. 1B. The plurality of storage circuits 105'*f* and 105'*g* may correspond to the plurality of storage circuits 105*e* and 105*f* explained in the detailed of FIG. 1B.

Furthermore, the readout circuitry 105' may include the plurality of secondary switches 105'*h*, 105'*i*, 105'*j*, and 105'*k*. The plurality of secondary switches 105'*h*, 105'*i*, 105'*j*, and 105'*k* may include a first secondary switch 105'*h*, a second secondary switch 105'*i*, a third secondary switch 105'*j*, and a fourth secondary switch 105'*k*. In an example embodiment, the first secondary switch 105'*h* may be coupled between the first interface circuit 105'*a* and one particular column of the pixel array. The first secondary switch 105'*h* may be configured to couple/decouple the first interface circuit 105'*a* with the particular column of the pixel array. For instance, the first secondary switch 105'*h* may turn-on/turn-off a connection between the first interface circuit 105'*a* and the particular column of the pixel array. Similarly, the third secondary switch 105'*j* may be coupled between the second interface circuit 105'*b* and the particular column of the pixel array for coupling/decoupling the second interface circuit 105'*b* with the particular column of the pixel array. In an example embodiment, the second secondary switch 105'*i* may be coupled between the first interface circuit 105'*a* and the ADC circuit 105'*c*. The second secondary switch 105'*i* may be configured to couple/decouple the first interface circuit 105'*a* with the ADC circuit 105'*c*. For instance, the second secondary switch 105'*i* may turn-on/turn-off a connection between the first interface circuit 105'*a* and the ADC circuit 105'*c*. Similarly, the fourth secondary switch 105'*k* may be coupled between the second interface circuit 105'*b* and the ADC circuit 105'c for coupling/decoupling the second interface circuit 105'b with the ADC circuit 105'c.

Hereinafter, a configuration of the signal processing system 101 may be referred to as a first configuration, when each readout circuitry of the signal processing system 101 is implemented with the readout circuitry 105 explained in the detailed description of FIG. 1B. Alternatively, the configuration of the signal processing system 101 may be referred to as a second configuration, when each readout circuitry of the signal processing system 101 is implemented with the readout circuitry 105' explained in the detailed description of FIG. 1C.

First Configuration of the Signal Processing System 101

Referring back to FIG. 1A, the signal processing system 101 may further include a controller 107. The controller 107 may be operatively coupled to the plurality of readout circuitries 105. In an example embodiment, the controller 107 may be configured to control the plurality of readout circuitries 105 such that all the plurality of readout circuitries 105 operates at the same time. In this example embodiment, for operating all the plurality of readout circuitries 105 at the same time, the controller 107 may generate and provide, to the plurality of readout circuitries 105, global control signals (also referred to as control inputs), bias voltages, clock signals and/or the like. The controller 107 may be a micro-controller-based circuitry. For instance, the controller 107 may be a sequencer unit that provides the global control signals, the bias voltages, the clock signals and/or the like. The controller 107 may be embodied as a microcontroller unit (MCU), a field programmable gate array (FPGA), an application specific integrated circuit (ASIC), a special-purpose computer chip, or the like. For example, the controller 107 may use protocols such as a serial peripheral interface (SPI) protocol and/or an inter-integrated circuit protocol to communicate with different components of the signal processing system 101.

In an example embodiment, to control the plurality of readout circuitries 105, the controller 107 may be configured to execute a data distribution operation. In an embodiment, the data distribution operation may include a sampling operation, an ADC conversion operation, and a data transmission operation. In an example embodiment, upon executing the sampling operation, the controller 107 may be configured to control the interface circuit 105a of each readout circuitry 105 to sample the analog signal(s). For instance, the controller 107 may generate control signal(s) for the interface circuit 105a to start/stop the sampling of the analog signal(s). In an example embodiment, upon executing the ADC conversion operation, the controller 107 may be configured to control the ADC circuit 105b of each readout circuitry 105 to convert the sampled analog signal(s) into its corresponding digital signal(s). For instance, the controller 107 may generate control signal(s) for the ADC circuit 105b to start/stop the ADC conversion. In an example embodiment, upon executing the data transmission operation, the controller 107 may be configured to control a transmitter 111 to transmit the digital signal(s). For instance, the controller 107 may generate control signal(s) for the transmitter 111 to start/stop the transmission of the digital signal(s). In an example embodiment, the controller 107 may be further configured to control the plurality of switches 105c and 105d of each readout circuitry 105. To this end, the controller 107 may be configured to iteratively execute a first operation. In an example embodiment, the first operation may be a first ping-pong operation. As used herein, the first ping-pong operation may be an algorithm that randomly turns-on one switch of the plurality of switches 105c and 105d in a first iteration, while another switch of the plurality of switches 105c and 105d is turned-off. Further, in a second iteration, the algorithm: (i) turns-on a switch that was turned-off in the first iteration; and (ii) turns-off a switch that was turned-on in the first iteration.

Upon executing the first operation in a current iteration, the controller 107 may be configured to control, for example, the first switch 105c of each readout circuitry 105 to decouple the ADC circuit 105b of each readout circuitry 105 from the corresponding first storage circuit 105e of each read circuitry 105. As a result, the digital signal converted by the ADC circuit 105b in the current iteration (or a current time instance) may not be stored in the first storage circuit 105e. However, the first storage circuit 105e of each readout circuitry 105 may store a previous digital signal that was outputted by the corresponding ADC circuit 105b in a previous iteration. For instance, the previous iteration may be prior in time with respect to the current iteration.

Further, the controller 107 may be configured to control the second switch 105d of each readout circuitry 105 to couple the ADC circuit 105b of each readout circuitry 105 to the corresponding second storage circuit 105f of each readout circuitry 105. As a result, the digital signal converted by the ADC circuit 105b of each readout circuitry 105 in the current iteration may be stored in the corresponding second storage circuit 105f of each readout circuitry 105.

Furthermore, the signal processing system 101 may include a plurality of tertiary switches 109a and 109b. In an example embodiment, the plurality of tertiary switches 109a and 109b may be coupled between the plurality of readout circuitries 105 and a transmitter 111, as illustrated in FIG. 1A. The plurality of tertiary switches 109a and 109b may include a first tertiary switch 109a and a second tertiary switch 109b. The first tertiary switch 109a may be configured to couple/decouple the first storage circuit 105e of each readout circuitry 105 with the transmitter 111. The second tertiary switch 109b may be configured to couple/decouple the second storage circuit 105f of each readout circuitry 105 with the transmitter 111.

According to an embodiment, the controller 107 may be further configured to control the plurality of tertiary switches 109a and 109b. In an example embodiment, the controller 107 may control the plurality of tertiary switches 109a and 109b by iteratively executing the first operation. Upon executing the first operation in the current iteration, the controller 107 may be configured to control the second tertiary switch 109b to decouple the second storage circuit 105f of each readout circuitry 105 from the transmitter 111. Further, the controller 107 may be configured to control the first tertiary switch 109a to couple the first storage circuit 105e of each readout circuitry 105 to the transmitter 111. In an example embodiment, upon executing the first operation, the controller 107 may switch: (i) one storage circuit in the plurality of storage circuits 105e and 105f of each readout circuitry 105 from a storing phase to a transmitting phase, and (ii) another storage circuit in the plurality of storage circuits 105e and 105f of each readout circuitry 105 from the transmitting phase to the storing phase. In other words, the controller 107 may control (i) the plurality of switches 105c and 105d of each readout circuitry 105 and (ii) the plurality of tertiary switches 109a and 109b to switch (i) one storage circuit in the plurality of storage circuits 105e and 105f of each readout circuitry 105 from the storing phase to the transmitting phase, and (ii) another storage circuit in the plurality of storage circuits 105e and 105f of each readout circuitry 105 from the transmitting phase to the storing phase. For example, in the current iteration, the controller 107 may switch the first storage circuit 105e of each readout circuitry 105 from the storing phase to the transmitting phase, by (i) coupling the first storage circuit 105e of each readout circuitry 105 to the transmitter 111 and (ii) decoupling the first storage circuit 105e of each readout circuitry 105 from the corresponding ADC circuit 105b of each readout circuitry 105. Further, in the current iteration, the controller 107 may switch the second storage circuit 105f of each readout circuitry 105 from the transmitting phase to the storing phase, by (i) coupling the second storage circuit 105f of each readout circuitry 105 to the corresponding ADC circuit 105b of each readout circuitry 105 and (ii) decoupling the second storage circuit 105f of each readout circuitry 105 from the transmitter 111.

According to an embodiment, the transmitter 111 may be configured to transmit the previous digital signal stored in the first storage circuit 105e of each readout circuitry 105. For instance, the first storage circuits 105e of the plurality of readout circuitries 105 that are daisy-chain connected may feed the stored digital signal(s) to the transmitter 111. For example, the daisy-chain connection of the first storage circuits 105e may enable shifting of the previous digital signal stored in the first storage circuit 105e of one readout circuitry 105 to the first storage circuit 105e of the next subsequent readout circuitry 105. Thereby, the transmitter 111 may transmit the previous digital signal stored in the first storage circuit 105e of each readout circuitry 105. In an example embodiment, the previous digital signal stored in the first storage circuit 105e of each readout circuitry 105 may be transmitted as a digital data. For instance, the digital data may be a sequence of bit codes. Further, the transmitted previous digital signal may be used in generation of the digital image. For instance, the transmitted previous digital signal may correspond to pixel data of one row of the digital image.

Accordingly, in the current iteration, the current digital signal may be generated by the ADC circuit 105b of each readout circuitry 105 and further the generated current digital signal may be stored in one of the corresponding plurality of storage circuits 105e and 105f of each readout circuitry 105 by turning-on (or coupling) one switch of the plurality of switches 105c and 105d, while enabling a transmission of the previous digital signal generated by the ADC circuit 105b of each readout circuitry 105 at the previous iteration by turning-off (or decoupling) another switch of the plurality of switches 105c and 105d. Therefore, the data conversion and the data transmission may be performed simultaneously. As a result, a required readout bandwidth may be achieved without using high-power ADCs and/or a greater number of ADCs. Thereby, the power requirements may be reduced. Further, since the data transmission and the data conversion are performed simultaneously, memory requirements of the signal processing system 101 may be reduced. For instance, the storage circuits of large storage size may not be required, since the data transmission and the data conversion are performed simultaneously.

Further, upon executing the first operation in a next iteration, the controller 107 may be configured to control the second switch 105d of each readout circuitry 105 to decouple the ADC circuit 105b of each readout circuitry 105 from the corresponding second storage circuit 105f of each readout circuitry 105. As a result, the second storage circuit 105f of each readout circuitry 105 may not store a next digital signal generated by the corresponding ADC circuit 105b of each readout circuitry 105 in the next iteration, while storing the current digital signal of the current iteration. The controller 107 may be further configured to control the first switch 105c of each readout circuitry 105 to couple the ADC circuit 105b of each readout circuitry 105 to the corresponding first storage circuit 105e of each readout circuitry 105. Thereby, the next digital signal generated by the ADC circuit 105b of each readout circuitry 105 may be stored in the corresponding first storage circuit 105e of each readout circuitry 105. Furthermore, the controller 107 may be configured to control the first secondary switch 109a to decouple the plurality of readout circuities 105 from the transmitter 111. Furthermore, the controller 107 may be configured to control the second secondary switch 109b to couple the plurality of readout circuities 105 to the transmitter 111 for transmitting the current digital signal stored in the second storage circuit 105f of each reach readout circuitry 105.

In this way, the controller 107 may be configured to iteratively execute the first operation for controlling the plurality of switches 105c and 105d of each readout circuitry 105 and/or the plurality of secondary switches 109a and 109b. Thereby, the controller 107 may enable the signal processing system 101 to simultaneously perform the operations of data conversion and transmission.

For purpose of explanation, in FIG. 1A and FIG. 1B, the controller 107 configured to turn-off (or decouple) the first switch 105c and turn-on (or couple) the second switch 105d in the current iteration is considered. However, the controller 107 may randomly turn-on/turn-off the plurality of switches 105c and 105d. For example, in some implementations, the controller 107 may turn-on (or couple) the first switch 105c and turn-off (or decouple) the second switch 105d in the current iteration.

Second Configuration of the Signal Processing System 101

Referring to FIG. 1A, in the second configuration of the signal processing system 101, each readout circuitry 105 may be replaced with the readout circuitry 105' described in the detailed description of FIG. 1C. Accordingly, in the second configuration, the signal processing system 101 may include the plurality of readout circuitries 105', the controller 107, the plurality of tertiary switches 109a and 109b, and the transmitter 111. The controller 107 may be configured to execute the data distribution operation to control the plurality of readout circuitries 105'. For instance, the data distribution operation may include the sampling operation, the ADC conversion operation, and the data transmission operation. In an example embodiment, upon executing the sampling operation, the controller 107 may be configured to control the multiple interface circuits 105'a and 105'b of each readout circuitry 105' to sample the analog signal(s). For instance, the controller 107 may generate control signal(s) for each of the multiple interface circuits 105'a and 105'b to start/stop the sampling of the analog signal(s). In an example embodiment, upon executing the ADC conversion operation, the controller 107 may be configured to control the ADC circuit 105'c of each readout circuitry 105' to convert the sampled analog signal(s) into its corresponding digital signal(s). For instance, the controller 107 may generate control signal(s) for the ADC circuit 105'c to start/stop the ADC conversion. In an example embodiment, upon executing the data transmission operation, the controller 107 may be configured to control the transmitter 111 to transmit the digital signal(s). For instance, the controller 107 may generate control signal(s) for the transmitter 111 to start/stop the transmission of the digital signal(s).

Further, the controller 107 may be configured to iteratively execute a second ping-pong operation for controlling the plurality of secondary switches 105'h, 105'i, 105'j, and 105'k of each readout circuitry 105'. For instance, the second ping-pong operation may be the algorithm that randomly turns-on (i) one of the two secondary switches 105'h and 105'i associated with the first interface circuit 105'a and (ii) one of the two secondary switches 105'j and 105'k associated with the second interface circuit 105'b, in one iteration. For example, upon executing the second ping-pong operation in the current iteration, the controller 107 may be configured to control the first secondary switch 105'h of each readout circuitry 105' to couple the first interface circuit 105'h of each readout circuitry 105' to the respective column of the pixel array. Further, the controller 107 may be configured to control the second secondary switch 105'i of each readout circuitry 105' to decouple the first interface circuit 105'h of each readout circuitry 105' from the corresponding ADC circuit 105'c. In an example embodiment, the controller 107 may control the first interface circuit 105'a of each readout circuitry 105' to start the sampling of the analog signal(s) from the respective column of the pixel array, while the first interface circuit 105'a of each readout circuitry 105' is: (i) coupled to the respective column of the pixel array and (ii) decoupled from the corresponding ADC circuit 105'c of each readout circuitry 105'. In another example embodiment, the first interface circuit 105'a of each readout circuitry 105' may automatically start the sampling of the analog signal(s) from the respective column of the pixel array, while the first interface circuit 105'a of each readout circuitry 105' is: (i) coupled to the respective column of the pixel array and (ii) decoupled from the corresponding ADC circuit 105'c of each readout circuitry 105'. Accordingly, in the current iteration, the first interface circuit 105'a of each readout circuitry 105' may be configured to sample the analog signal(s) from the respective column of the pixel array.

Further, upon executing the second ping-pong operation in the current iteration, the controller 107 may be configured to control the third secondary switch 105'j of each readout circuitry 105' to decouple the second interface circuit 105'b of each readout circuitry 105' from the respective column of the pixel array. Furthermore, the controller 107 may be configured to control the fourth secondary switch 105'k of each readout circuitry 105' to couple the second interface circuit 105'b of each readout circuitry 105' to the corresponding ADC circuit 105'c of each readout circuitry 105'. In an example embodiment, the controller 107 may control the second interface circuit 105'b of each readout circuitry 105' to stop the sampling of the analog signal(s) from the respective column of the pixel array, while the second interface circuit 105'b of each readout circuitry 105' is: (i) decoupled from the respective column of the pixel array and (ii) coupled to the corresponding ADC circuit 105'c of each readout circuitry 105'. In another example embodiment, the second interface circuit 105'b of each readout circuitry 105' may automatically stop the sampling of the analog signal(s) from the respective column of the pixel array, while the second interface circuit 105'b of each readout circuitry 105' is: (i) decoupled from the respective column of the pixel array and (ii) coupled to the corresponding ADC circuit 105'c of each readout circuitry 105'. Accordingly, in the current iteration, the second interface circuit 105'b of each readout circuitry 105' may not sample the analog signal(s), but the second interface circuit 105'b of each readout circuitry 105' may forward previous sampled analog signal(s) to the corresponding ADC circuit 105'c of each readout circuitry 105'. For instance, the previous sampled analog signal(s) may be the samples of the analog signal(s) that was sampled by the second interface circuit 105'b of each readout circuitry 105' in a previous iteration. For example, the previous iteration may be prior in time with respect to the current iteration.

Once the ADC circuit 105'c of each readout circuitry 105' receives the sampled analog signal(s), the ADC circuit 105'c of each readout circuitry 105' may start the ADC conversion in the current iteration. For instance, the ADC circuit 105'c of each readout circuitry 105' may automatically start the ADC conversion, upon receiving the sampled analog signal(s). Alternatively, the controller 107 may controller the ADC circuit 105'c of each readout circuitry 105' to start the ADC conversion in the current iteration. Accordingly, upon executing the second ping-pong operation, the signal processing system 101 may perform the data conversion (i.e., the ADC conversion) and data sampling (i.e., the sampling of the analog signal(s)) simultaneously. As a result, the ADC circuit 105'c of each readout circuitry 105' may perform the ADC conversion without waiting for the interface circuit to sample the analog signal(s). Thereby, the readout bandwidth of the signal processing system 101 may be improved. For instance, since the data conversion and the data sampling are performed simultaneously, a readout time of the signal processing system may be reduced.

Furthermore, the controller 107 may iteratively execute the first operation to control (i) the plurality of switches 105'd and 105'e of each readout circuitry 105' and (ii) the plurality of tertiary switches 109a and 109b, as explained in the first configuration of the signal processing system 101. As a result of controlling (i) the plurality of switches 105'd and 105'e of each readout circuitry 105' and (ii) the plurality of tertiary switches 109a and 109b, one storage circuit of the plurality of storage circuits 105'f and 105'g of each readout circuitry 105' may be switched from the storing phase to the transmitting phase and another storage circuit of the plurality of storage circuits 105'f and 105'g of each readout circuitry 105' may be switched from the transmitting phase to the storing phase. For instance, in the current iteration, the first storage circuit 105'f of each readout circuitry 105' may be switched from the storing phase to the transmitting phase, by (i) coupling the first storage circuit 105'f of each readout circuitry 105' to the transmitter 111 and (ii) decoupling the first storage circuit 105'f of each readout circuitry 105' from the corresponding ADC circuit 105'c of each readout circuitry 105'. Further, in the current iteration, the second storage circuit 105'g of each readout circuitry 105' may be switched from the transmitting phase to the storing phase, by (i) coupling the second storage circuit 105'g of each readout circuitry 105' to the corresponding ADC circuit 105'c of each readout circuitry 105' and (ii) decoupling the second storage circuit 105'g of each readout circuitry 105' from the transmitter 111. Thereby, upon executing the first operation in the current iteration, the first storage circuit 105'f of each readout circuitry 105' may feed the previous digital signal(s) stored in the first storage circuit 105'f of each readout circuitry 105' to the transmitter 111, while the second storage circuit 105'g of each readout circuitry 105' may store the current digital signal(s) generated by the corresponding ADC circuit 105'c of each readout circuitry 105'. Accordingly, upon executing the first operation, the data conversion and the data transmission may be performed simultaneously. Therefore, upon executing the first operation and the second ping-pong operation, the signal processing system 101 may simultaneously perform the data sampling, the data conversion, and the data transmission. As a result, the readout bandwidth of the signal processing system may be further improved. For instance, since the data sampling, the data transmission and the data conversion are performed simultaneously, the readout time of the signal processing system may be further reduced. Accordingly, the required readout bandwidth may be achieved without using high-power ADCs and/or a greater number of ADCs. Thereby, the power requirements may be reduced.

FIG. 2 illustrates a block diagram showing an exemplary architecture of a transmitter 201, according to some embodiments of the present disclosure. FIG. 2 is explained in conjunction with FIG. 1A, FIG. 1B, and FIG. 1C. The transmitter 201 may correspond to the transmitter 111. According to an embodiment, the digital signal stored in the first storage circuit 105e (or the first storage circuit 105'f) and/or the second storage circuit 105f (or the second storage circuit 105'g) may correspond to parallel digital data, since the plurality of readout circuitries 105 (or the plurality of readout circuitries 105'c) are connected in parallel. In order to convert the parallel digital data into a serial digital data, the transmitter 201 may include a serializer circuit 203. For instance, the serializer circuit 203 may have two inputs, where one input corresponds to even digital codes and another input corresponds to odd digital codes in the first storage circuit and/or the second storage circuit. The serializer circuit 203 may convert the parallel digital codes of even and odd digital codes to the serial digital data including a correct order of digital codes. In this way, the serializer circuit 203 may be configured to convert the parallel digital data into the serial digital data. Thereby, the serializer circuit 203 of the transmitter 201 may enable the transmitter 201 to serially transmit the digital data stored in the first storage circuit 105e and/or the second storage circuit 105f.

In an example embodiment, the transmitter 201 may further include a Pseudo-Random Binary Sequence (PRBS) generator 205. The PRBS generator 205 may be configured to randomly generate a stream of digital bits to encode the serial digital data outputted by the serializer circuit 203 into a general test pattern that provide a representation of scrambled or random non-return-to-zero (NRZ) data. For instance, the PRBS generator 205 may generate random digital data (i.e., the random stream of digital bits) such that the generated test pattern includes equal number of ones and zeroes for a given bit interval. Further, the PRBS generator 205 may generate the random digital data such that a maximum number of consecutive identical digits (CIDs) in the generated test pattern is limited. For instance, the PRBS generator 205 may be denoted as '$2^{(x)}-1$' PRBS generator where the notation 'x' indicates a shift register length used in the PRBS generator. For example, a short PRBS generator such as '$2^{(7)}-1$' PRBS generator (i.e., 127 bit PRBS generator) may be used in high-speed video applications, because it provides an accurate approximation of an 8b10b-encoded NRZ data stream.

Furthermore, the transmitter 201 may include a retimer 207a and driver 207b. The retimer 207a may be configured to synchronize the random digital data generated by the PRBS generator 205 and the serial digital data outputted by the serializer circuit 203. The driver 207b may be configured to convert a single-ended digital signal(s) outputted by the retimer 207a into a differential output. In an example embodiment, to reduce the power dissipation, the driver 207b may be working in a current mode. For instance, output current levels may be regulated during high frequency conditions for reducing the power dissipation in the transmitter 111. In this example configuration, the transmitter 201 may transmit the digital signal(s) as the differential output(s). For instance, the transmitter 111 may correspond to high-speed transmitters such as a low voltage differential signaling (LVDS) transmitter, a scalable low voltage signaling (SLVS) transmitter, or the like. Once the differential output is transmitted, the differential output may be converted into a low voltage complementary metal oxide semiconductor (LVCMOS) output level for generating the digital image at a receiver end.

FIG. 3 illustrates a block diagram showing an exemplary architecture of a storage circuit 301, according to an embodiment of the present disclosure. FIG. 3 is explained in conjunction with FIG. 1A, FIG. 1B and FIG. 1C. The storage circuit 301 may correspond to the first storage circuit 105e (or the first storage circuit 105'f) and/or the second storage circuit 105f (or the second storage circuit 105'g). According to an embodiment, the storage circuit 301 may store the digital signal(s) generated by the ADC circuit as the even and odd digital codes, by splitting the digital signal(s) into the even and odd digital codes. To this end, the storage circuit 301 may include an even memory circuit 303 and an odd memory circuit 305. The even memory circuit 303 may include a plurality of even registers 307, 309, 311, and 313. The odd memory circuit 305 may include a plurality of odd registers 315, 317, 319, and 321. For instance, if a resolution of the ADC circuit is 'n' bits, then the storage circuit 301 may include 'n' registers, where 'n/2' registers of the 'n' registers may correspond to the even registers and another 'n/2' registers of the 'n' registers may correspond to the odd registers. In an example embodiment, the plurality of even registers 307, 309, 311, and 313 and the plurality of odd registers 315, 317, 319, and 321 may enable the storage circuit 301 to feed the digital signal(s) stored in the storage circuit 301 to the transmitter 111 in the transmitting phase. For example, the storage circuit 301 may be controlled by the control 107 to feed the digital signal(s) into the transmitter 111 in the transmission phase.

Further, the storage circuit 301 may include logic circuits 323, 325, 327, and 329 that are connected to the plurality of even registers 307, 309, 311, and 313 respectively as illustrated in FIG. 3. Furthermore, the storage circuit 301 may include logic circuits 331, 333, 335, and 337 that are connected to the plurality of odd registers 315, 317, 319, and 321 respectively as illustrated in FIG. 3. In an example embodiment, the logic circuits 323, 325, 327, 329, 331, 333, 335, and 337 may enable the storage circuit 301 to store the output (e.g. ADC Out) of the ADC circuit in the storing phase. For example, the storage circuit 301 may be controlled by the control 107 to store the digital signal(s) in the storing phase. The logic circuits 323, 325, 327, 329, 331, 333, 335, and 337 may be embodied as D flip-flop or the like. The registers 307, 309, 311, 313, 315, 317, 319, and 321 of the storage circuit 301 may have same reset signal, same clock signal and same ADC Out signal. For instance, the reset signal and the clock signal may be provided by the controller 107. Additionally, the controller 107 may also provide a plurality of even latches (e.g. EvenLatch <1:n/2>) and a plurality of odd latches (e.g. OddLatch <1:n/2>).

FIG. 4A illustrates a block diagram showing a signal processing system 401 for an imaging device 403, according to another embodiment of the present disclosure. FIG. 4 is explained in conjunction with FIG. 1A and FIG. 1C. The imaging device 403 may correspond to the imaging device 103. The imaging device 403 may include the pixel array having the plurality of pixel sensors that are arranged in 'N' columns and 'i' rows as illustrated in FIG. 4A.

The signal processing system 401 may correspond to the second configuration of the signal processing system 101. Some embodiments are based on the realization that an increase in number of readout circuitries 405 per column of the imagining device 403 may increase a frame rate associated with the imaging device 403. For instance, for the imaging device 403 with the pixel array of 'N' columns and 'i' rows, a frame time, $T_{frame}$, may defined as a time taken to produce one image of i×N pixels. For instance, the frame time ($T_{frame}$) may include a sampling time (e.g. time taken to sample and forward the sampled analog signals to the ADC circuit), a conversion time (e.g. time taken to convert the received analog signal to its corresponding digital signal), and a transmission time (e.g. time taken to transit the digital signal for generating the digital image). For example, the frame time may be mathematically defined as shown in Equation (1).

$$T_{frame} = \frac{i}{k_{cprc}} \times T_{conv,adc} \qquad \text{Equation (1)}$$

where the notation $k_{cprc}$ indicates a number of readout circuitries 405 per column of the imaging device 403 and the notation $T_{conv,adc}$ may be the conversion time of the ADC circuit. In Equation (1), the sampling time and the transmission time are not considered, because the signal processing system 401 simultaneously performs the data sampling, the data conversion, and the data transmission in a single iteration.

Observation on Equation (1) indicates that the frame time, $T_{frame}$, is inversely proportional to the number of readout circuitries 405 per column, $k_{cprc}$. Accordingly, when the number of readout circuitries 405 per column, $k_{cprc}$, is increased, the frame time, $T_{frame}$, may reduce. As a result, the frame rate of the imaging device 403 may increase.

To this end, the signal processing system 401 may include multiple readout circuitries 405 per column of the imaging device 403. In an example embodiment, the signal processing system 401 may include 'i' readout circuitries 405 per column of the imaging device 403. In total, the signal processing system 401 may include 'i×N' readout circuitries 405 that are connected in parallel, where each readout circuitry 405 is further connected to the pixel sensor of the pixel array of the imaging device 403 as illustrated in FIG. 4A. Accordingly, in this example embodiment, the signal processing system 401 may perform the readout operation for all 'i×N' pixel sensors in one iteration.

The readout circuitry 405 may correspond to the readout circuitry 105' explained in the detailed description of FIG. 1C. The readout circuitry 405 may include one or more interface circuits 405a and 405b. The one or more interface circuits 405a and 405b may be configured to receive the analog signal(s) from a respective pixel sensor of the pixel array. Further, the one or more interface circuits 405a and 405b may be configured to sample the analog signal(s) to generate the sampled analog signal(s). The one or more interface circuits 405a and 405b may correspond to the one or more interface circuits 105'a and 105'b respectively. Further, the readout circuitry 405 may include an ADC circuit 405c coupled to the one or more interface circuits 405a and 405b to receive the sampled analog signal(s). The ADC circuit 405c may be configured to convert the received analog signal(s) into its corresponding digital signal(s). The ADC circuit 405c may correspond to the ADC circuit 105'c. Furthermore, the readout circuitry 405 may include a plurality of switches 405d and 405e that are coupled between the ADC circuit 405c and a plurality of storage circuits 405f and 405g. The plurality of storage circuits 405f and 405g may correspond to the plurality of storage circuits 105'f and 105'g respectively. The plurality of switches 405d and 405e may correspond to the plurality of switches 105'd and 105'e respectively. The plurality of switches 405d and 405e may include a first switch 405d that is coupled between the ADC circuit 405c and a first storage circuit 405f of the plurality of storage circuits 405f and 405g. Further, the plurality of switches 405d and 405e may include a second switch 405e that is coupled between the ADC circuit 405c and a second storage circuit 405g of the plurality of storage circuits 405f and 405g. Furthermore, the readout circuitry 405 may include a plurality of secondary switches 405h, 405i, 405j, and 405k. The plurality of secondary switches 405h, 405i, 405j, and 405k includes (i) a first secondary switch 405h coupled between the respective pixel sensor of the pixel array and the first interface circuit 405a, (ii) a second secondary switch 405i coupled between the first interface circuit 405a and the ADC circuit 405c, (iii) a third secondary switch 405j coupled between the respective pixel sensor of the pixel array and the second interface circuit 405b, and (iv) a fourth secondary switch 405k coupled between the second interface circuit 405b and the ADC circuit 405c. The plurality of secondary switches 405h, 405i, 405j, and 405k may correspond to the plurality of secondary switches 105'h, 105'i, 105'j, and 105'k.

Further, the signal processing system 401 may include a controller 407 that is coupled to the plurality of readout circuitries 405. The controller 407 may correspond to the controller 107. In an example embodiment, the controller 407 may be configured to iteratively execute the second ping-pong operation for controlling the plurality of secondary switches 405h, 405i, 405j, and 405k. For example, upon executing the second ping-pong operation in the current iteration, the controller 407 may be configured to control the first secondary switch 405h of each readout circuitry 405 to couple the respective pixel sensor to the first interface circuit 405a of each readout circuitry 405.

Further, the controller 407 may be configured to control the second secondary switch 405i of each readout circuitry 405 to decouple the first interface circuit 405a of each readout circuitry 405 from the corresponding ADC circuit 405c of each readout circuitry 405. In an example embodiment, the first interface circuit 405a of each readout circuitry 405 may sample the analog signal(s) from the respective pixel sensor, when the first interface circuit 405a of each readout circuitry 405 is: (i) coupled to the respective pixel sensor of the pixel array and (ii) decoupled from the corresponding ADC circuit 405c of each readout circuitry 405. For instance, the first interface circuit 405a may be controlled by the controller 407 to start the sampling of the analog signal(s). Alternatively, the first interface circuit 405a may automatically start the sampling of the analog signal(s), when the first interface circuit 405a of each readout circuitry 405 is: (i) coupled to the respective pixel sensor of the pixel array and (ii) decoupled from the corresponding ADC circuit 405c of each readout circuitry 405. Furthermore, upon executing the second ping-pong operation in the current iteration, the controller may be configured to control the third secondary switch 405j of each readout circuitry 405 to decouple the second interface circuit 405b from the respective pixel sensor of the pixel array. Furthermore, the controller 407 may be configured to control the fourth secondary switch 405k of each readout circuitry 405 to couple the second interface circuit 405b of each readout circuitry 405 to the corresponding ADC circuit 405c of each readout circuitry 405. In an example embodiment, when the second interface circuit 405b of each readout circuitry 405 is: (i) decoupled from the respective pixel sensor of the pixel array and (ii) coupled to the corresponding ADC circuit 405c of each readout circuitry 405, the second interface circuit 405b of each readout circuitry 405 may not sample the analog signal(s), but the second interface circuit 405b of each readout circuitry 405 may forward the previous sampled analog signal(s) to the corresponding ADC circuit 405c of each readout circuitry 405. Once the ADC circuit 405c of each readout circuitry 405 received the previous sampled analog signal(s), the ADC circuit 405c may start the ADC conversion in the current iteration. Accordingly, upon executing the second ping-pong operation, the signal processing system 101 may perform the data conversion and the data sampling simultaneously. As a result, the ADC circuit 405c of each readout circuitry 405 may perform the ADC conversion without waiting for the interface circuit to sample the analog signal(s). Thereby, the readout bandwidth of the signal processing system 401 may be improved.

Further, the controller 407 may be configured to control the plurality of switches 405c and 405d of each readout circuitry 405, by iteratively executing the first operation. For instance, the first operation may be the first ping-pong operation. Upon executing the first operation in the current iteration, the controller 407 may be configured to control the first switch 405d of each readout circuitry 405 to decouple the ADC circuit 405c of each readout circuitry 405 from the corresponding first storage circuit 405f of each readout circuitry 405. Thereby, the digital signal(s) converted by the ADC circuit 405c in the current iteration may not be stored in the first storage circuit 405f. However, the first storage circuit 405f of each readout circuitry 405 may store a previous digital signal that was outputted by the corresponding ADC circuit 405c in the previous iteration.

Further, the controller 407 may be configured to control the second switch 405e of each readout circuitry 405 to couple the ADC circuit 405c of each readout circuitry 405 to the corresponding second storage circuit 405g of each readout circuitry 405. Thereby, the digital signal converted by the ADC circuit 405c of each readout circuitry 405 in the current iteration may be stored in the corresponding second storage circuit 405g of each readout circuitry 405.

Furthermore, the signal processing system 401 may include a plurality of tertiary switches 409a and 409b the are coupled between the plurality of readout circuitries 405 and a transmitter 411, as illustrated in FIG. 4A. The plurality of tertiary switches 409a and 409b may correspond to the plurality of tertiary switches 109a and 109b respectively. The plurality of tertiary switches 409a and 409b may include a first tertiary switch 409a and a second tertiary switch 409b. The first tertiary switch 409a may be configured to couple/decouple the first storage circuit 405f of each read circuitry 405 with the transmitter 411. The second tertiary switch 409b may be configured to couple/decouple the second storage circuit 405g of each read circuitry 405 with the transmitter 411.

According to an embodiment, the controller 407 may be further configured to control the plurality of tertiary switches 409a and 409b. In an example embodiment, the controller 407 may control the plurality of tertiary switches 409a and 409b by iteratively executing the first operation. Upon executing the first operation in the current iteration, the controller 407 may be configured to control the second tertiary switch 409b to decouple the second storage circuit 405g of each readout circuitry 405 from the transmitter 411. Further, the controller 407 may be configured to control the first tertiary switch 409a to couple the first storage circuit 405f of each readout circuitry 405 to the transmitter 411. According to an embodiment, the transmitter 411 may be configured to transmit, as the digital data, the previous digital signal stored in the first storage circuit 405f of each readout circuitry 405. The transmitter 411 may correspond to the transmitter 111. The transmitter 411 may include a serializer circuit 411a, a PRBS generator 411b, a retimer 411c, and a driver 411d for serially transmitting the previous digital signal stored in the first storage circuit 405f of each readout circuitry 405.

Accordingly, upon executing the first operation in the current iteration, the current digital signal generated by the ADC circuit 405c of each readout circuitry 405 may be stored in one of the corresponding plurality of storage circuits 405f and 405g of each readout circuitry 405 by turning-on (or coupling) one switch of the plurality of switches 405d and 405e, while enabling the transmission of the previous digital signal generated at the previous iteration by turning-off (or decoupling) another switch of the plurality of switches 405d and 405e. Therefore, upon executing the first operation in the current iteration, the data conversion and the data transmission may be performed simultaneously. Accordingly, by executing the first operation and the second ping-pong operation, the data sampling, the data conversion, and the data transmission may be performed simultaneously. As a result, the readout bandwidth of the signal processing system 401 may be further improved. Accordingly, the required readout bandwidth may be achieved without using high-power ADCs and/or a greater number of ADCs. Thereby, the power requirements may be reduced.

Since the signal processing system 401 includes multiple readout circuitries 405 per column of the imaging device 403, the digital data to be transmitted by the transmitter 411 may be more in comparison the digital data transmitted by the transmitter 111 of the signal processing system 101. To this end, it is an objective of some embodiments to increase data rate of the transmitter 411. For instance, if a single transmitter is used in the signal processing system 401, then a minimum data rate of the transmitter 411 may be designed using Equation (2).

$$f_{TX,min} = \frac{n_{adc} \times k_{cprc} \times N}{T_{cnv,adc}} \quad \text{Equation (2)}$$

where the notation $n_{adc}$ indicates the resolution of the ADC circuit, the notation $k_{cprc}$ may be the number of readout circuitries per column, the notation N may be a number of columns in the pixel array of the imaging device 403, and the notation $T_{cnv,adc}$ may be conversation time of the ADC circuit.

According to some other embodiments, when the signal processing system 401 includes multiple readout circuitries 405 per column of the imaging device 403, the signal processing system 401 may include multiple transmitters for transmitting the digital data. For instance, a configuration of the signal processing system 401 with multiple transmitter is as illustrated in FIG. 4B.

FIG. 4B illustrates a block diagram showing the signal processing system 401 with multiple transmitters, according to an embodiment of the present disclosure. Some embodiments are based on the recognition that the use of multiple transmitters in the signal processing system 401 may provide a relaxation on the data rate requirements of the single transmitter. Further, the use of multiple transmitters may also increase data transfer speed. To this end, in some embodiments, the signal processing system 401 may include multiple transmitters. For instance, the signal processing system 401 may include, for example, from transmitter-1

(i.e. the transmitter 411) to transmitter-k (i.e. a transmitter 413). When the signal processing system 401 includes multiple transmitters, the plurality of storage circuits 405*f* and 405*g* of the plurality of readout circuitries 405 connected to the single transmitter 411 may be divided among the multiple transmitters. For example, when the signal processing system 401 includes multiple transmitters, a number of the plurality of storage circuits 405*f* and 405*g* connected to one transmitter may be calculated based on the number of columns, N, in the imaging device 403, the number of readout circuitries 405 per column, $k_{cprc}$, and a number of transmitters used in the signal processing system 401. For instance, the number of the plurality of storage circuits 405*f* and 405*g* connected to one transmitter may be mathematically calculated using Equation (3).

$$N_{mem} = \frac{N \times k_{cprc}}{\# \text{ of the } TXs}. \quad \text{Equation (3)}$$

For purpose of explanation, in FIG. 4B, the signal processing system 401 having the multiple transmitters is considered. In some implementation, the signal processing system 101 (e.g. the first configuration and/or the second configuration of the system 101) may also have multiple transmitters to provide the relaxation on the data rate requirements of the single transmitter and further to improve the data transfer speed. For instance, to achieve a specific frame rate, the signal processing system 101 (or the signal processing system 401) may be subjected to variations such as a variation in the number of readout circuitries per column, a variation in the ADC resolution, a variation in the number of ADC circuits per readout circuitry, a variation in the number of transmitters, and/or a variation in the number of storage circuits.

FIG. 5A illustrates a block diagram showing a signal processing system 501 for a mobile device 503, according an embodiment of the present disclosure. FIG. 5A is explained in conjunction with FIG. 1A and FIG. 1C. The signal processing system 501 may correspond to the second configuration of the signal processing system 101 with one readout circuitry. For instance, the signal processing system 501 may be embodied within the mobile device 503 such as a smart phone or the like.

For example, when a user 505 of the mobile device 503 utters phrase(s), a microphone 507 embodied within the mobile device 503 may be configured to convert sound waves into the analog signal(s). Further, the microphone 507 may forward the analog signal(s) to the signal processing system 501. The signal processing system 501 may be configured to convert the received analog signal(s) into its corresponding digital signal(s). Further, the signal processing system 501 may be configured to transmit the digital signal(s) to a mobile device transceiver 509 for further processing. To this end, the signal processing system 501 may include a circuitry 511, a controller 513, and a transmitter 515. The circuitry 511 may correspond to the readout circuitry 105' explained in the detailed description of FIG. 1C. The circuitry 511 may include one or more interface circuits 511*a* and 511*b*, an ADC circuit 511*c*, a plurality of switches 511*d* and 511*e*, a plurality of storage circuits 511*f* and 511*g*, and a plurality of secondary switches 511*h*, 511*i*, 511*j*, and 511*k*.

In an example embodiment, the controller 513 may be configured to control the plurality of secondary switches 511*h*, 511*i*, 511*j*, and 511*k* by iteratively executing the second ping-pong operation. For example, upon executing the second ping-pong operation on the current iteration, the controller 107 may control a first secondary switch 511*h* to couple a first interface circuit 511*a* to the microphone 507. Further, the controller 107 may control a second secondary switch 511*i* to decouple the first interface circuit 511*a* from the ADC circuit 511*c*. In an example embodiment, the first interface circuit 511*a* may be configured to receive and sample the analog signal(s) from the microphone 507, while the first interface circuit 511*a* is: (i) coupled to the microphone 507 and (ii) decoupled from the ADC circuit 511*c*. For instance, the first interface circuit 511*a* may be controlled by the controller 513 to start the sampling of the analog signal(s), when the first interface circuit 511*a* is: (i) coupled to the microphone 507 and (ii) decoupled from the ADC circuit 511*c*. Alternatively, the first interface circuit 511*a* may automatically start the sampling of the analog signal(s), when the first interface circuit 511*a* is: (i) coupled to the microphone 507 and (ii) decoupled from the ADC circuit 511*c*. Furthermore, upon executing the second ping-pong operation on the current iteration, the controller 513 may be configured to control a third secondary switch 511*j* to decouple a second interface circuit 511*b* from the microphone 507. Furthermore, the controller 513 may be configured to control a fourth secondary switch 511*k* to couple the second interface circuit 511*b* to the ADC circuit 511*c*. In an example embodiment, the second interface circuit 511*b* may not sample the analog signal(s) from the microphone 507 but may forward the previous sampled analog signals to the ADC circuit 511*c*, while the second interface circuit 511*b* is: (i) decoupled from the microphone 507 and (ii) coupled to the ADC circuit 511*c*. Once the ADC circuit 511*c* receives the previous sampled analog signal(s), the ADC circuit 511*c* may start the ADC conversion for generating the current digital signal(s) in the current iteration. For the ADC circuit 511*c* may be controlled by the controller 513 to start the ADC conversion. Alternatively, the ADC circuit 511*c* may automatically start the ADC conversion, after receiving the previous sampled analog signal(s). Accordingly, upon executing the second ping-pong operation, the signal processing system 501 may simultaneously perform the data sampling and the data conversion. As a result, the ADC circuit 511*c* may perform the ADC conversion without waiting for the interface circuit to sample the analog signal(s). Thereby, the readout bandwidth of the signal processing system 501 may be improved.

Further, the controller 513 may be configured to control the plurality of switches 511*d* and 511*e* by iteratively executing the first operation. For instance, the first operation may correspond to the first ping-pong operation. Upon executing the first operation in the current iteration, the controller 513 may be configured to control a first switch 511*d* of the plurality of switches 511*d* and 511*e* to decouple the ADC circuit 511*c* from a first storage circuit 511*f* of the plurality of storage circuits 511*f* and 511*g*. Thereby, the digital signal generated by the ADC circuit 511*b* in the current iteration may not be stored in the first storage circuit 511*f*. However, the first storage circuit 511*f* may store the previous digital signal generated by the ADC circuit 511*c* in the previous iteration.

Further, the controller 513 may be configured to control a second switch 511*e* of the plurality of switches 511*d* and 511*e* to couple the ADC circuit 511*c* to a second storage circuit 511*g* of the plurality of storage circuit 511*f* and 511*g*. Thereby, the digital signal generated by the ADC circuit 511*c* in the current iteration may be stored in the second storage circuit 511*g*.

Further, in some embodiments, the signal processing system 501 may include a plurality of tertiary switches 517a and 517b coupled between the circuitry 511 and the transmitter 515. The transmitter 515 may correspond to the transmitter 111. In these embodiments, the controller 513 may be further configured to control the plurality of tertiary switches 517a and 517b by iteratively executing the data distribution operation. The plurality of tertiary switches 517a and 517b may correspond to the plurality of secondary switches 109a and 109b respectively. In an example embodiment, the controller 513 may be configured to control a second tertiary switch 517b of the plurality of tertiary switches 517a and 517b to decouple the second storage circuit 511g from the transmitter 515. Further, the controller 513 may be configured to control a first tertiary switch 517a of the plurality of tertiary switches 517a and 517b to couple the first storage circuit 511f to the transmitter 515 for transmitting the previous digital signal stored in the first storage circuit 511f.

Accordingly, upon executing the first operation in the current iteration, the current digital signal generated by the ADC circuit 511b may be stored in one of the plurality of storage circuits 511f and 511g by turning-on (or coupling) one switch of the plurality of switches 511d and 511e, while enabling the transmission of the previous digital signal generated at the previous iteration by turning-off (or decoupling) another switch of the plurality of switches 511d and 511e and/or turning-on (or coupling) one of the plurality of tertiary switches 517a and 517b. Therefore, upon executing the first operation, the data conversion and the data transmission may be performed simultaneously. Accordingly, by executing the first operation and the second operation, the signal processing system 101 may simultaneously perform the data sampling, the data conversion, and the data transmission. Therefore, the readout bandwidth of the signal processing system 501 may be further improved. As a result, the required readout bandwidth may be achieved without using high-power ADCs and/or a greater number of ADCs. Thereby, the power requirements may be reduced.

For exemplary purpose, in FIG. 5A, the signal processing system 501 coupled with the microphone 507 for performing the analog-to-digital conversion is considered. However, the signal processing system 101 may be coupled with other components of the mobile device 503 to perform the analog-to-digital conversion. For instance, the signal processing system 501 may be couple with a LIDAR APD array of the mobile device 503 to perform the analog-to-digital conversion as explained in the detailed description of FIG. 5B.

FIG. 5B illustrates a block diagram of the signal processing system 501 for the mobile device 503, according to another embodiment of the present disclosure. In this embodiment, the signal processing system 501 may be coupled with a LIDAR APD array 519 of the mobile device 503. For instance, the LIADR APD array 519 may be realized as a light detecting and ranging (LIDAR) receiver system with an avalanche photodiode (APD) array. In an example embodiment, the LIDAR APD array 519 may receive light signals reflected from the objects such as buildings, humans, vehicles, plants, etc. Further, the LIDAR APD array 519 may convert the received light signals into its corresponding analog signal(s). These analog signal(s) may be processed by the signal processing system 501 to generate and transmit the corresponding digital signal(s), as explained in the detailed description of FIG. 5A. Since the signal processing system 501 performs the analog-digital conversion by simultaneously performing the data sampling, the data conversion, and the data transmission, the signal processing system 501 may generate and transmit the digital signal(s) in efficient manner in comparison to the available methods.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A signal processing system for an imaging device, the signal processing system comprising:
    a plurality of readout circuitries connected in parallel, wherein each readout circuitry is further connected to a plurality of pixel sensors that are arranged in a column of a pixel array of the imaging device, wherein each readout circuitry comprises:
        one or more interface circuits configured to receive an analog signal from a respective column of the pixel array;
        an analog-to-digital converter (ADC) circuit coupled to the one or more interface circuits, wherein the ADC circuit is configured to convert the analog signal, received from the respective column of the pixel array, to a digital signal; and
        a plurality of switches coupled between the ADC circuit and a plurality of storage circuits, wherein the plurality of switches comprises: (i) a first switch coupled between the ADC circuit and a first storage circuit of the plurality of storage circuits and (ii) a second switch coupled between the ADC circuit and a second storage circuit of the plurality of storage circuits;
    a controller coupled to the plurality of readout circuitries, wherein the controller is configured to iteratively execute a first operation, wherein when the first operation is executed in a current iteration, the controller is configured to:
        control the first switch of each readout circuitry to decouple the ADC circuit of each readout circuitry from the first storage circuit of each readout circuitry, wherein the first storage circuit of each readout circuitry is configured to store a previous digital signal of a previous iteration for the respective column of the pixel array; and
        control the second switch of each readout circuitry to couple the ADC circuit of each readout circuitry to the second storage circuit of each readout circuitry, wherein the second storage circuit of each readout circuitry is configured to store a current digital signal of the current iteration converted by the corresponding ADC circuit for the respective column of the pixel array; and a transmitter coupled to the plurality of readout circuitries, wherein the transmitter is configured to transmit the previous digital signal stored in the first storage circuit of each readout circuitry while the current digital signal of the current iteration is stored in the second storage circuit of each readout circuitry.

2. The signal processing system of claim 1, wherein the first operation corresponds to a first ping-pong operation.

3. The signal processing system of claim 1, wherein each readout circuitry further comprises a plurality of secondary switches, and wherein: (i) a first secondary switch of the plurality of secondary switches is coupled between the plurality of pixel sensors and a first interface circuit of the one or more interface circuits, (ii) a second secondary switch of the plurality of secondary switches is coupled between the first interface circuit and the ADC circuit, (iii) a third secondary switch of the plurality of secondary switches is coupled between the plurality of pixel sensors and a second interface circuit of the one or more interface circuits, and (iv) a fourth secondary switch of the plurality of secondary switches is coupled between the second interface circuit and the ADC circuit.

4. The signal processing system of claim 3, wherein the controller is further configured to iteratively execute a second ping-pong operation, wherein when the second ping-pong operation is executed in the current iteration, the controller is configured to:

control the first secondary switch of each readout circuit to couple the plurality of pixel sensors and the first interface circuit;

control the second secondary switch of each readout circuit to decouple the first interface circuit from the ADC circuit;

control the third secondary switch of each readout circuit to decouple the plurality of pixel sensors from the second interface circuit; and control the fourth secondary switch of each readout circuit to couple the secondary interface circuit to the ADC circuit.

5. The signal processing system of claim 1, further comprising a plurality of tertiary switches coupled between the plurality of readout circuitries and the transmitter.

6. The signal processing system of claim 5, wherein the controller is further configured to control, by executing the first operation, a first tertiary switch of the plurality of tertiary switches to couple the first storage circuit of each readout circuitry to the transmitter for transmitting the previous digital signal stored in the first storage circuit of each readout circuitry.

7. The signal processing system of claim 5, wherein the controller is further configured to control, by executing the first operation, a second tertiary switch of the plurality of tertiary switches to decouple the second storage circuit of each readout circuitry from the transmitter.

8. The signal processing system of claim 1, wherein the transmitter comprises a serializer circuit for serially transmitting the previous digital signal stored in the first storage circuit of each readout circuitry.

9. The signal processing system of claim 1, wherein the first storage circuit of one readout circuitry is daisy-chain connected to the first storage circuit of another readout circuitry.

10. The signal processing system of claim 1, wherein the second storage circuit of one readout circuitry is daisy-chain connected to the second storage circuit of another readout circuitry.

11. A signal processing system for an imaging device, the signal processing system comprising:

a plurality of readout circuitries connected in parallel, wherein each readout circuitry is further connected to a pixel sensor of a pixel array of the imaging device, wherein each readout circuitry comprises:

one or more interface circuits configured to receive an analog signal from a respective pixel sensor of the pixel array;

an analog-to-digital converter (ADC) circuit coupled to the one or more interface circuits, wherein the ADC circuit is configured to convert the analog signal, received from the respective pixel sensor of the pixel array, to a digital signal; and a plurality of switches coupled between the ADC circuit and a plurality of storage circuits, wherein the plurality of switches comprises: (i) a first switch coupled between the ADC circuit and a first storage circuit of the plurality of storage circuits and (ii) a second switch coupled between the ADC circuit and a second storage circuit of the plurality of storage circuits;

a controller coupled to the plurality of readout circuitries, wherein the controller is configured to iteratively execute a first operation, wherein when the first operation is executed in a current iteration, the controller is configured to:

control the first switch of each readout circuitry to decouple the ADC circuit of each readout circuitry from the first storage circuit of each readout circuitry, wherein the first storage circuit of each readout circuitry is configured to store a previous digital signal of a previous iteration for the respective pixel sensor of the pixel array; and control the second switch of each readout circuitry to couple the ADC circuit of each readout circuitry to the second storage circuit of each readout circuitry, wherein the second storage circuit of each readout circuitry is configured to store a current digital signal of the current iteration converted by the corresponding ADC circuit for the respective pixel sensor of the pixel array; and one or more transmitters coupled to the plurality of readout circuitries, wherein the one or more transmitters are configured to transmit the previous digital signal stored in the first storage circuit of each readout circuitry while the current digital signal of the current iteration is stored in the second storage circuit of each readout circuitry.

12. The signal processing system of claim 11, wherein the first operation corresponds to a first ping-pong operation.

13. The signal processing system of claim 11, wherein each readout circuitry further comprises a plurality of secondary switches, and wherein: (i) a first secondary switch of the plurality of secondary switches is coupled between the pixel sensor and a first interface circuit of the one or more interface circuits, (ii) a second secondary switch of the plurality of secondary switches is coupled between the first interface circuit and the ADC circuit, (iii) a third secondary switch of the plurality of secondary switches is coupled between the pixel sensor and a second interface circuit of the one or more interface circuits, and (iv) a fourth secondary switch of the plurality of secondary switches is coupled between the second interface circuit and the ADC circuit.

14. The signal processing system of claim 13, wherein the controller is further configured to iteratively execute a second ping-pong operation, wherein when the second ping-pong operation is executed in the current iteration, the controller is configured to:
control the first secondary switch of each readout circuit to couple the pixel sensor and the first interface circuit;
control the second secondary switch of each readout circuit to decouple the first interface circuit from the ADC circuit;
control the third secondary switch of each readout circuit to decouple the pixel sensor from the second interface circuit; and
control the fourth secondary switch of each readout circuit to couple the secondary interface circuit to the ADC circuit.

15. The signal processing system of claim 11, further comprising a plurality of tertiary switches coupled between the plurality of readout circuitries and the one or more transmitters.

16. The signal processing system of claim 11, wherein the controller is further configured to control, by executing the first operation, a first tertiary switch of the plurality of tertiary switches to couple the first storage circuit of each readout circuitry to the one or more transmitters for transmitting the previous digital signal stored in the first storage circuit of each readout circuitry.

17. The signal processing system of claim 11, wherein the controller is further configured to control, by executing a data distribution operation, a second tertiary switch of the plurality of tertiary switches to decouple the second storage circuit of each readout circuitry from the one or more transmitters.

18. The signal processing system of claim 11, wherein the one or more transmitters comprise a serializer circuit for serially transmitting the previous digital signal stored in the first storage circuit of each readout circuitry.

19. A signal processing system for transmitting digital data, the signal processing system comprising:
a circuitry comprising:
one or more interface circuits configured to receive an analog signal from a respective column of a pixel array;
an analog-to-digital converter (ADC) circuit coupled to the one or more interface circuits, wherein the ADC circuit is configured to convert the analog signal, received from the respective column of the pixel array, to a digital signal; and
a plurality of switches coupled between the ADC circuit and a plurality of storage circuits;
a controller coupled to the circuitry, wherein the controller is configured to iteratively execute a first operation, wherein when the first operation is executed in a current iteration, the controller is configured to:
control a first switch of the plurality of switches to decouple the ADC circuit from a first storage circuit of the plurality of storage circuits, wherein the first storage circuit is configured to store a previous digital signal of a previous iteration for the respective column of the pixel array; and
control a second switch of the plurality of switches to couple the ADC circuit to a second storage circuit of the plurality of storage circuits, wherein the second storage circuit is configured to store a current digital signal of the current iteration converted by the ADC circuit for the respective column of the pixel array; and
a transmitter coupled to the circuitry, wherein the transmitter is configured to transmit the previous digital signal as the digital data while the current digital signal of the current iteration is stored in the second storage circuit of each readout circuitry.

20. A method for transmitting digital data, the method comprising:
receiving, by one or more interface circuits, an analog signal from a respective column of a pixel array;
converting, by an analog-to-digital converter (ADC) circuit, the analog signal, received from the respective column of the pixel array, to a digital signal;
iteratively executing, by a controller, a first operation, wherein when the first operation is executed in a current iteration, the controller is configured for:
controlling a first switch of a plurality of switches to decouple the ADC circuit from a first storage circuit of a plurality of storage circuits, wherein the first storage circuit is configured for storing a previous digital signal of a previous iteration for the respective column of the pixel array; and
controlling a second switch of the plurality of switches to couple the ADC circuit from a second storage circuit of a plurality of storage circuits, wherein the second storage circuit is configured for storing a current digital signal of the current iteration converted by the ADC circuit for the respective column of the pixel array; and
transmitting, by a transmitter, the previous digital signal as the digital data while the current digital signal of the current iteration is stored in the second storage circuit of each readout circuitry.

* * * * *